United States Patent
Yamamoto et al.

[11] Patent Number: 6,054,795
[45] Date of Patent: *Apr. 25, 2000

[54] DRIVING APPARATUS FOR VIBRATION TYPE ACTUATOR DEVICE

[75] Inventors: Shinji Yamamoto, Yokohama; Kenichi Kataoka, Kawasaki; Tadashi Hayashi, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/842,046

[22] Filed: Apr. 23, 1997

[30] Foreign Application Priority Data

| Apr. 24, 1996 | [JP] | Japan | 8-102560 |
| May 23, 1996 | [JP] | Japan | 8-128314 |
| Mar. 7, 1997 | [JP] | Japan | 9-053019 |

[51] Int. Cl.[7] ................................ H02N 2/00
[52] U.S. Cl. ........................... 310/316.01; 310/317
[58] Field of Search ....................... 310/316, 317, 310/316.01, 316.02

[56] References Cited

U.S. PATENT DOCUMENTS

| 4,954,741 | 9/1990 | Furutsu et al. | 310/316 |
| 4,954,742 | 9/1990 | Izukawa et al. | 310/316 |
| 5,001,404 | 3/1991 | Kataoka | 318/116 |
| 5,004,964 | 4/1991 | Kataoka et al. | 318/128 |
| 5,157,300 | 10/1992 | Kataoka et al. | 310/323 |
| 5,285,134 | 2/1994 | Kataoka | 318/116 |
| 5,436,521 | 7/1995 | Kataoka | 310/317 |
| 5,459,370 | 10/1995 | Kataoka | 310/317 |
| 5,539,268 | 7/1996 | Kataoka | 310/316 |
| 5,736,822 | 4/1998 | Mitarai et al. | 310/316 |

*Primary Examiner*—Thomas M. Dougherty
*Attorney, Agent, or Firm*—Fitzpatrick, Cella, Harper & Scinto

[57] ABSTRACT

This invention relates to a driving apparatus for a vibration type actuator device which obtains a driving force by applying a frequency signal to an electro-mechanical energy conversion element.

This invention provides, as the driving apparatus, a vibration type actuator device which changes the frequency of the frequency signal until the driving speed reaches a speed higher than a target speed upon driving control to the target speed, and thereafter, switches the control to the target speed to amplitude control of the frequency signal, so that the driving speed can be quickly changed to the target speed, and the subsequent target speed control can be appropriately performed.

33 Claims, 24 Drawing Sheets

FIG. 13

ABCEEFG

AAAAAAAAA
BBBBBBBBBBB
CCCCCCCCCCC
DDDDDDDDDDD
EEEEEEEEEEEE
FFFFFFFFFFFFF
GGGGGGGGGGGG

HHHHHHHHHHH
IIIIIIIIIIIIIIIII
JJJJJJJJJJ
KKKKKKKKKK
LLLLLLLLLLLLL
MMMMMMMM
NNNNNNNNNNN

OOOOOOOOOOOO
PPPPPPPPPPPP
QQQQQQQQQQQQ
RRRRRRRRRRR
SSSSSSSSSSS

AAAAAAAAA
BBBBBBBBBBB
CCCCCCCCCCC
DDDDDDDDDDD
EEEEEEEEEEEE
FFFFFFFFFFFFF
GGGGGGGGGGGG

HHHHHHHHHHH
IIIIIIIIIIIIIIIII
JJJJJJJJJJ
KKKKKKKKKK
LLLLLLLLLLLLL
MMMMMMMM
NNNNNNNNNNN

OOOOOOOOOOOO
PPPPPPPPPPPP
QQQQQQQQQQQQ
RRRRRRRRRRR
SSSSSSSSSSS

FIG. 24

|  | LAPSED TIME [ms] | TARGET SPEED [rpm] |
|---|---|---|
| v'1 | 10 | 3 |
| v'2 | 20 | 6 |
| v'3 | 30 | 9 |
| v'4 | 40 | 12 |
| v'5 | 50 | 15 |
| v'6 | 60 | 18 |
| v'7 | 70 | 21 |
| v'8 | 80 | 24 |
| v'9 | 90 | 27 |
| v'10 | 100 | 30 |
| v'11 | 110 | 33 |
| v'12 | 120 | 36 |
| v'13 | 130 | 39 |
| v'14 | 140 | 42 |
| v'15 | 150 | 45 |
| v'16 | 160 | 48 |
| v'17 | 170 | 51 |
| v'18 | 180 | 54 |
| v'19 | 190 | 57 |
| v'20 | 200 | 60 |
| v'21 | 210 | 63 |
| v'22 | 220 | 66 |
| v'23 | 230 | 69 |
| v'24 | 240 | 72 |
| v'25 | 250 | 75 |

DRIVING APPARATUS FOR VIBRATION TYPE ACTUATOR DEVICE

BACKGROUND OF THE INVENTION

1. Field of the Invention

The present invention relates to a control apparatus for a vibration type driving device which drives a vibration member to produce vibrations, and outputs a driving force by utilizing the vibration energy.

2. Related Background Art

Conventionally, a driving circuit for a vibration wave driving device such as a vibration wave motor or the like is constituted by an analog circuit such as a VCO (voltage-controlled oscillator), a phase shifter, and the like. However, the driving circuit is preferably constituted by a digital circuit to attain a size reduction and a cost reduction of the driving circuit. In an example of the driving circuit realized by a digital circuit, the leading and trailing edge timings of driving pulses as two-phase driving signals for driving a two-phase vibration type (vibration wave) motor are generated based on high-frequency reference clocks, and the switching timing of a switching element on the primary side of a transformer as a booster means is determined using these reference clocks.

When the driving signals are generated by the above-mentioned arrangement, the resolution of the oscillation frequency is limited by the clock frequency. When the speed of the vibration wave motor is to be manipulated based on the frequency alone, smooth speed control cannot be attained. For this reason, the speed must be controlled by manipulating both the frequency and the pulse width of the switching element on the primary side of the transformer.

In order to control both the frequency and pulse width, in Japanese Laid-Open Patent Application No. 64-85587, the speed is controlled by sweeping the frequency from higher to lower frequencies (since the frequency region higher than a resonance frequency in a waveform having the resonance frequency as a peak is used as the control region, the rotating speed increases as the frequency becomes lower in this control region), fixing the frequency when the speed has reached a predetermined speed, and then manipulating the driving voltage or pulse width. The speed at which the frequency is fixed substantially matches the speed when the driving voltage is controlled.

However, in the above-mentioned prior art, when the pulse width upon sweeping the frequency is set at a maximum width upon driving, since the speed at which the frequency is fixed substantially matches the target speed, if some environmental factor such as the load, temperature, or the like changes after the frequency is fixed, the motor can no longer be rotated at the target speed at the fixed frequency.

In order to avoid the above-mentioned problem, the frequency may be swept by setting the pulse width at a value smaller than that which corresponds to the maximum speed. However, since the motor output cannot be maximized upon starting, the rise time is long.

Furthermore, when the target speed is changed to a value that exceeds the variable range of the speed by means of the pulse width (amplitude) during driving by the above-mentioned method, normal driving may be disturbed.

For example, when the target value is changed to a speed which is larger than the upper limit of the variable range of the speed by means of the pulse width (amplitude), the driving speed cannot be raised to the target speed. On the other hand, when the target value is changed to a speed smaller than the lower limit of the variable range of the speed by means of the pulse width (amplitude), the vibration wave driving device enters a dead zone with respect to voltage, and stops.

Furthermore, when the pulse width (amplitude) alone is controlled, the variable range of the speed is narrow, and the target speed cannot be largely changed.

SUMMARY OF THE INVENTION

One aspect of the application is to provide a vibration type actuator device which can solve the above-mentioned problems by performing driving control in such a manner that the frequency of a frequency signal to be applied to an electromechanical energy conversion element is shifted until a speed shifted by a predetermined amount from a target speed is reached, and thereafter, the amplitude or phase is changed to attain the target speed.

One aspect of the application is to provide a vibration type actuator device which can solve the above-mentioned problems by performing driving control in such a manner that when a new target speed is set during the control for attaining a target speed by changing the amplitude or phase of a frequency signal, the new target speed is attained by changing the frequency, and thereafter, changing the amplitude or phase.

One aspect of the application is to provide a vibration type actuator device which can solve the above-mentioned problems by performing driving control in such a manner that upon executing the speed control to a target speed, the frequency is changed initially, the amplitude or phase is controlled after the frequency is locked, and the amplitude or phase is changed to a predetermined amplitude or phase while the frequency is being changed.

Other objects of the present invention will become apparent from the following description of the embodiments taken in conjunction with the accompanying drawings.

BRIEF DESCRIPTION OF THE DRAWINGS

FIG. 13 shows a document printed by the printer;

FIG. 24 shows a speed table in the ninth embodiment; and

DESCRIPTION OF THE PREFERRED EMBODIMENT

(First Embodiment)

Figure 2:
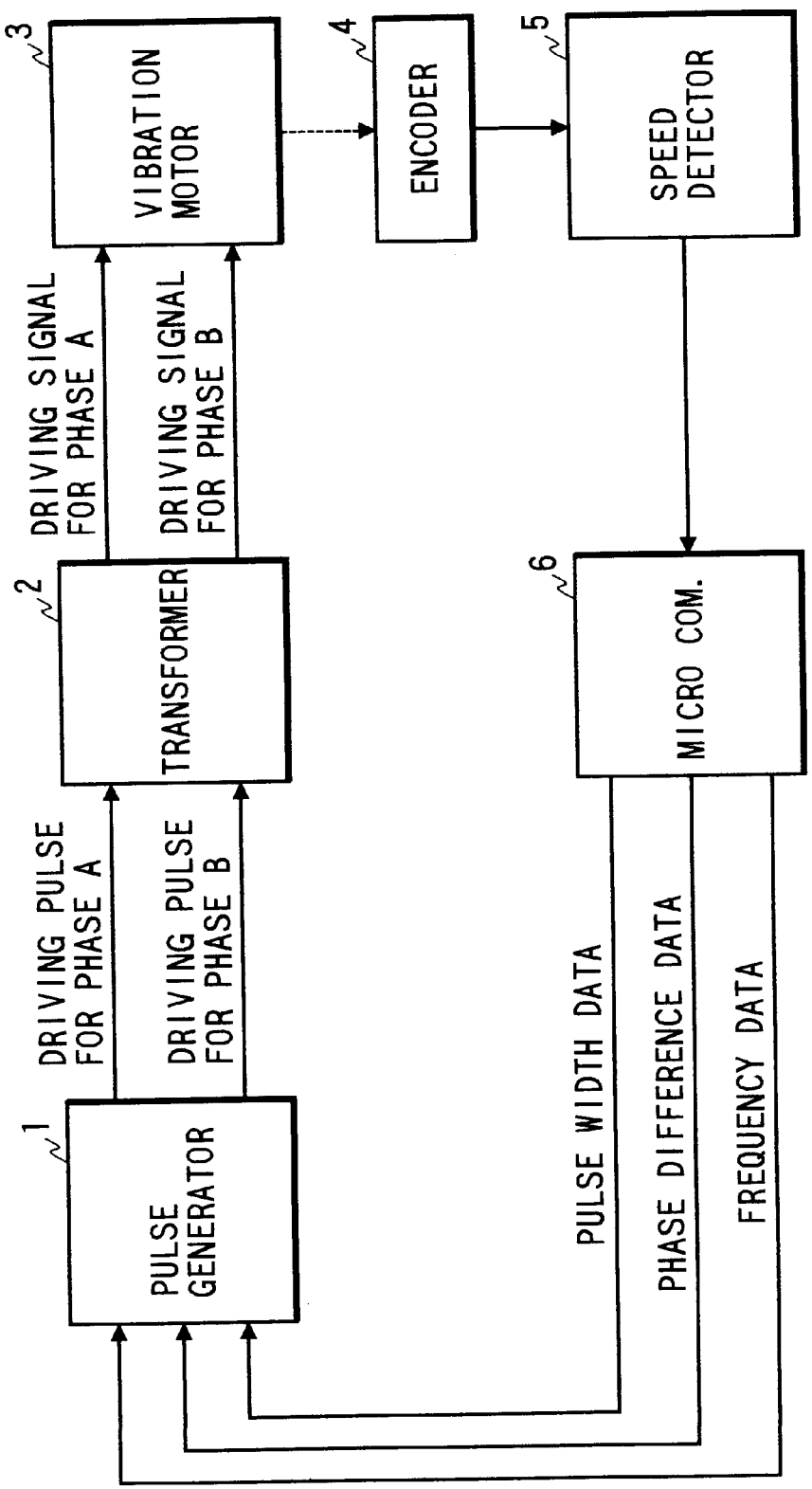
FIG. 2 is a block diagram showing the control circuit arrangement for a vibration type driving device according to the present invention.

FIG. 2 is a block diagram showing a control circuit for the first embodiment of a driving control apparatus of a vibration type driving device according to the present invention.

Figure 3:
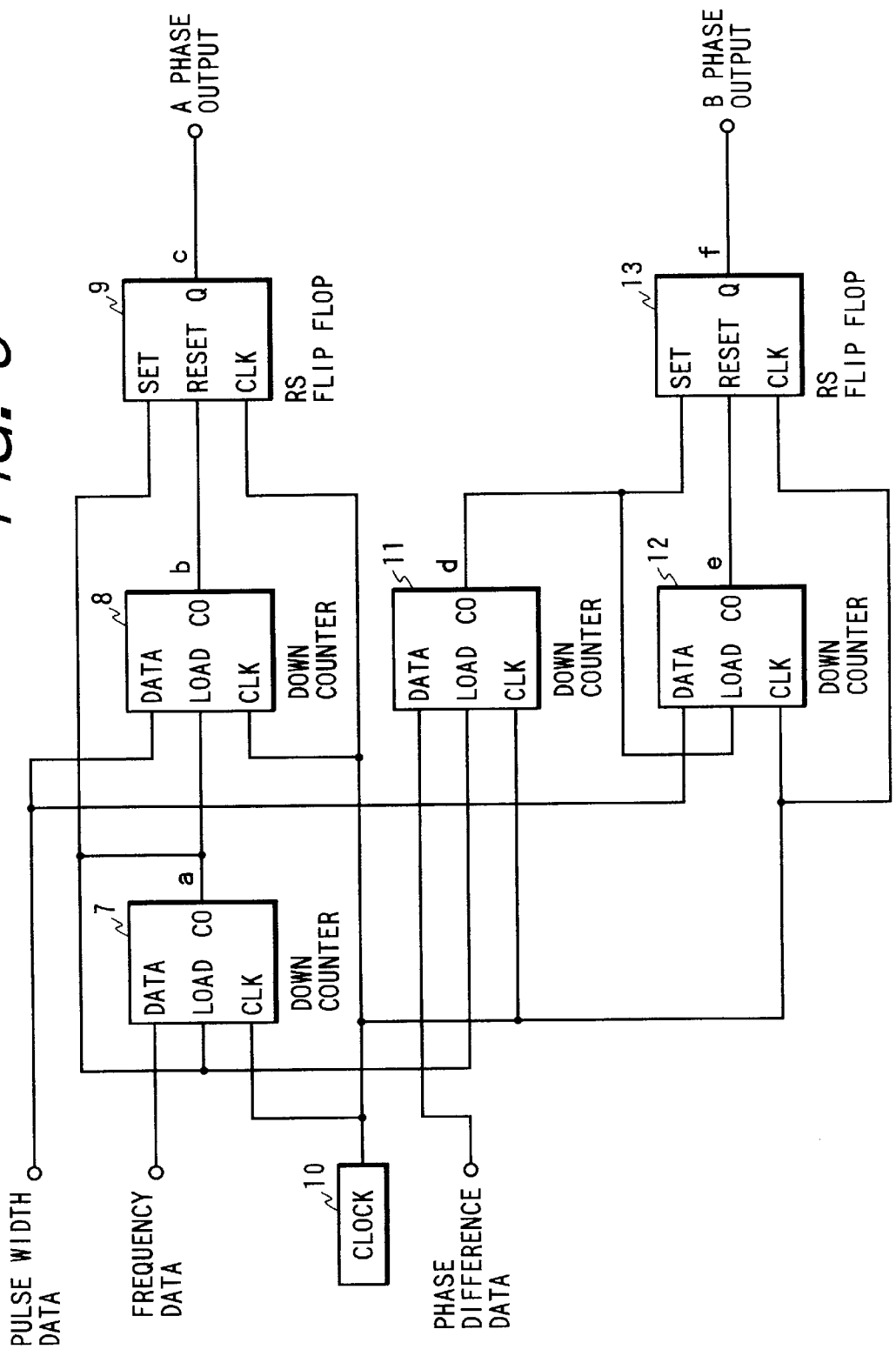
FIG. 3 is a circuit diagram of a pulse generator shown in FIG. 2.
Figure 4:
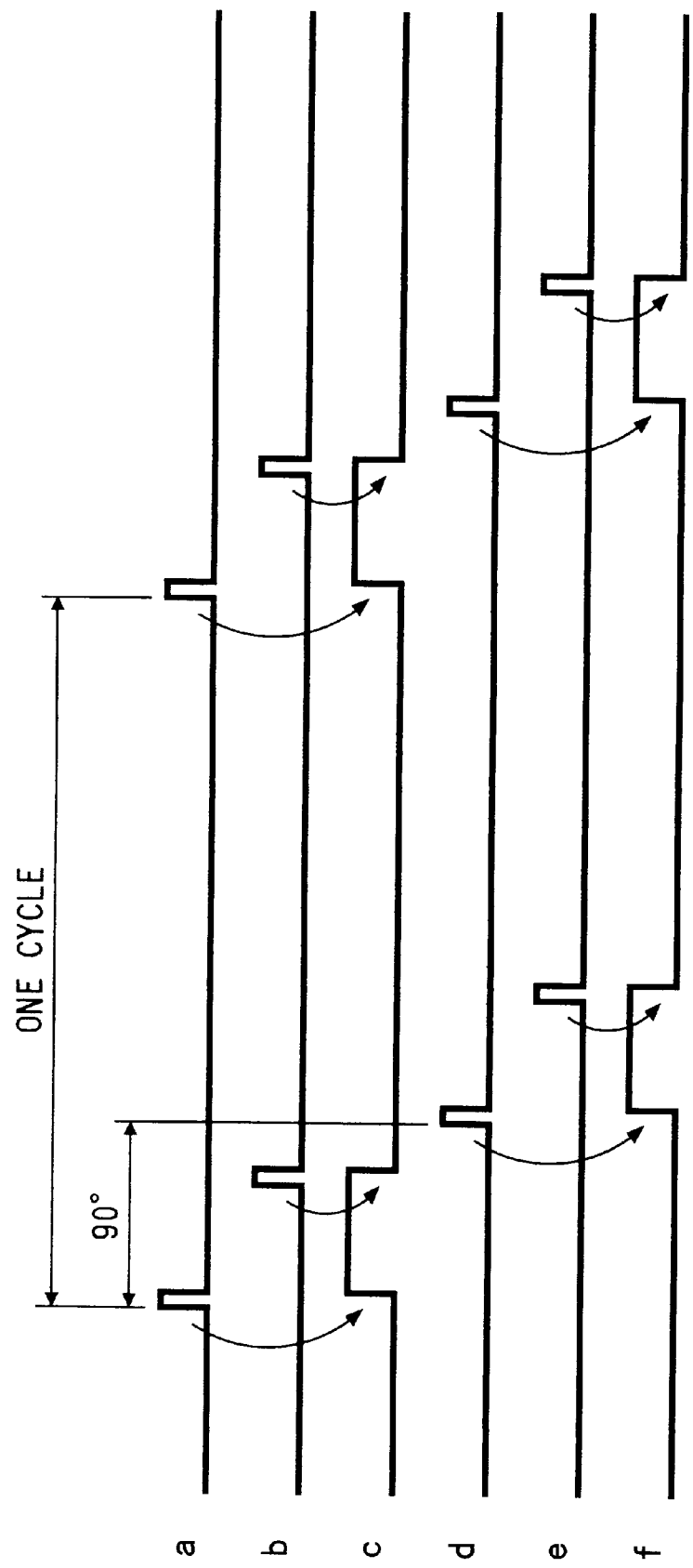
FIG. 4 is a timing chart showing the individual signals in the pulse generator shown in FIG. 2.

Referring to FIG. 2, a pulse generator 1 outputs driving pulses for two phases, i.e., A and B phases in correspondence with input frequency data, pulse width data, and phase difference data. FIG. 3 is a circuit diagram showing the internal arrangement of the pulse generator 1. A clock generator 10 generates reference timings of this circuit. A down counter 7 loads data consisting of a plurality of bits, which is input to its DATA terminal, when the input to its LOAD terminal changes to high level. When the data of the down counter becomes 0, the counter outputs a high-level signal from its CO terminal. FIG. 4 is a timing chart showing the states of the individual signals in the circuit shown in FIG. 3. Since the CO terminal of the down counter 7 is connected to its LOAD terminal, the output from the down counter 7 changes to high level for a one-clock period when the count value becomes zero to have frequency data as one cycle, as indicated by a in FIG. 4.

A down counter 8 has a function similar to that of the down counter 7. Since the CO output of the down counter 7 is connected to the LOAD input of the down counter 8, the down counter 8 loads pulse width data for each cycle of the driving pulses, and the CO output of the down counter 8 changes to high level after a time corresponding to the pulse width data lapses, as indicated by b in FIG. 4.

The Q output of an RS flip-flop 9 goes high when its SET input goes high, and goes low when its RESET input goes high. Since the CO output of the down counter 7 is connected to the SET input of the RS flip-flop 9 and the CO output of the down counter 8 is connected to the RESET input thereof, the Q output generates pulses which have the frequency data as one cycle, and change to high level for a time corresponding to the pulse width data. Such pulses serve as A phase outputs.

A down counter 11 determines the phase difference. Since the CO output of the down counter 7 is connected to the LOAD input of the down counter 11, the CO output of the down counter 11 changes to high level with a delay corresponding to the phase difference data after the down counter 7. Since the ideal time phase difference between two phases (A and B phases) to be applied to a vibration wave motor is 90°, the phase difference data is set at a value ¼ the frequency data. In this case, the CO output of the down counter 11 changes, as indicated by d in FIG. 4. As in the A phase, the CO output of a down counter 12 similarly changes, as indicated by e in FIG. 4, and the Q output of an RS flip-flop 13 changes, as indicated by f in FIG. 4.

As a consequence, the pulse generator 1 outputs two-phase pulses, which have the frequency data as one cycle, a pulse width corresponding to the pulse width data, and a phase difference of 90° therebetween.

Figure 5:
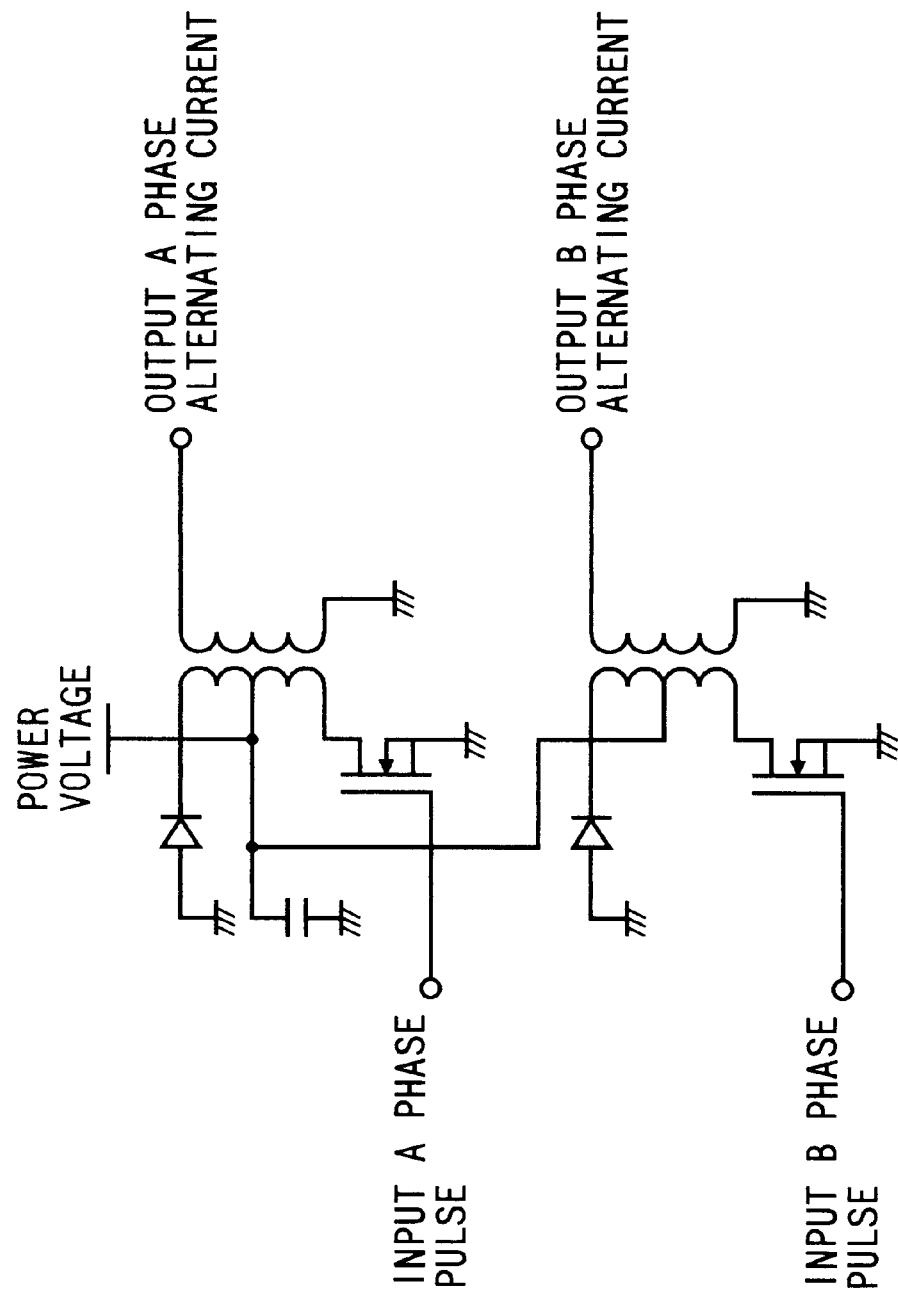
FIG. 5 is a circuit diagram of a transformer shown in FIG. 2.

Referring back to FIG. 2, a booster circuit 2 uses a transformer, an LC resonance circuit, or the like. FIG. 5 shows an example of the booster circuit that uses a transformer.

A vibration wave motor 3 has a stator and a rotor which is in press-contact with the stator. The stator has a structure in which a piezoelectric element (multilayered piezoelectric element) as an electro-mechanical energy conversion element is joined to the side surface of a vibration member, or a structure in which a piezoelectric element (multilayered piezoelectric element) is clamped and fixed between vibration members. As the driving signals, alternating current signals having a time phase difference of 90° therebetween are applied to the two-phase electrodes of the piezoelectric element (multilayered piezoelectric element) of the stator at a frequency near the resonance frequency of a system (the vibration system of the stator or vibration member), travelling waves are produced in the vibration member, thereby rotating the rotor which is in contact with the vibration member.

An encoder 4 is attached to the output shaft of the vibration wave motor 3, and outputs pulses corresponding to the rotation angle by optically or magnetically detecting the angle. A speed detector 5 measures and outputs the frequency of pulses output from the encoder 4. A microcomputer 6 determines various data for the pulse generator 1 on the basis of data obtained from the speed detector 5.

Figure 1:
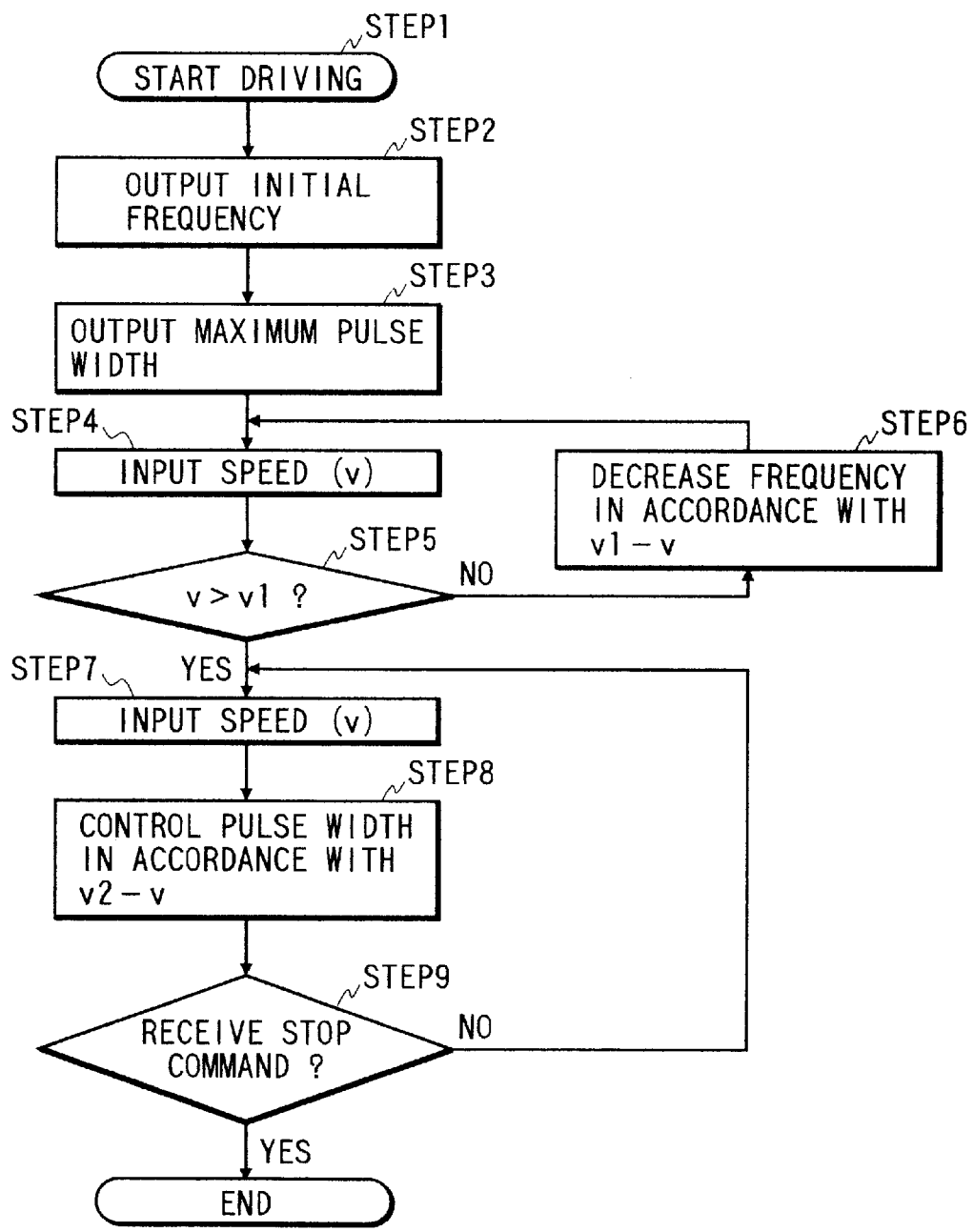
FIG. 1 is a flow chart showing the control operation according to the first embodiment of the present invention.

FIG. 1 is a flow chart showing the control operation of the microcomputer 6.

When a start command of the vibration wave motor is issued in response to an external signal or inside the microcomputer, driving is started in STEP 1.

In STEP 2, a predetermined initial frequency is output to the pulse generator 1. Note that the initial frequency selected in this case assumes a value at which a frequency higher than the resonance frequency of the vibration type (wave) motor 3 is set even when the vibration wave motor 3 suffers individual differences or the temperature, load, or the like has changed. This is because the frequency-speed characteristics of the vibration type (wave) motor have gradients in opposite directions to have the resonance frequency as a boundary, and since the gradient becomes extremely steep at frequencies lower than the resonance frequency, control cannot be made stably. In the frequency region higher than the resonance frequency, the driving speed increases as the driving frequency becomes lower; the driving speed decreases as the driving frequency becomes higher.

In STEP 3, a maximum pulse width within the range in which the vibration wave motor 3 or transformer 2 is not destroyed is set in the pulse generator 1 as pulse width data. This is to shorten the start time since the pulse width is selected to allow the vibration wave motor 3 to generate a maximum torque upon starting.

However, when an excessively large pulse width is set, the circuit element such as a switching element in the transformer 2 and the vibration wave motor may be destroyed. For this reason, the pulse width must be set in consideration of such point.

Although not described in the flow chart, the phase difference data to be output to the pulse generator 1 is set so that two-phase pulses output from the pulse generator 1 have a phase difference of 90°, i.e., a value ¼ of the frequency data is always output.

In STEP 4, data (v) is input from the speed detector 5.

In STEP 5, it is checked if the input speed (v) is larger than a value (v1) set in advance. If NO in STEP 5, the flow advances to STEP 6. Note that v1 is set at a value larger than a final target speed (v2).

In STEP 6, the driving frequency is decreased in accordance with the difference between the input speed (v) and the set value (v1). Since the frequency data of the pulse generator 1 defines the value of the cycle of the driving signal, decreasing the frequency means increasing the frequency data. The processing for changing the frequency data may be attained by adding a value obtained by multiplying v1−v by a certain constant, adding a value determined using a table set in correspondence with the value v1−v, or adding a constant value independently of v1−v. After STEP 6 is executed, the flow returns to STEP 4. The operations from STEP 4 to STEP 6 are executed at predetermined time intervals using timer interrupts or the like produced by the microcomputer.

If YES is determined in STEP 5, the flow advances to STEP 7. The frequency is fixed in this process, and is not changed from then on.

In STEP 7, speed data (v) is input as in STEP 4.

In STEP 8, the pulse width is controlled based on the difference between the input speed (v) and the target speed (v2). The processing for controlling the pulse width may be attained by a multiplication of v2−v and a constant or using a table. As described above, the target speed (v2) is set to be lower than the speed (v1) used as a reference upon fixing the frequency. As the detailed control in STEP 8, when v2−v is negative, the pulse width is decreased; when v2−v is positive, the pulse width is increased.

In STEP 9, it is checked if an external circuit or the microcomputer has issued a stop command to the vibration wave motor 3. If NO in STEP 9, the flow returns to STEP 7 to continue the speed control; otherwise, driving of the vibration type (wave) motor is stopped.

Figure 6:
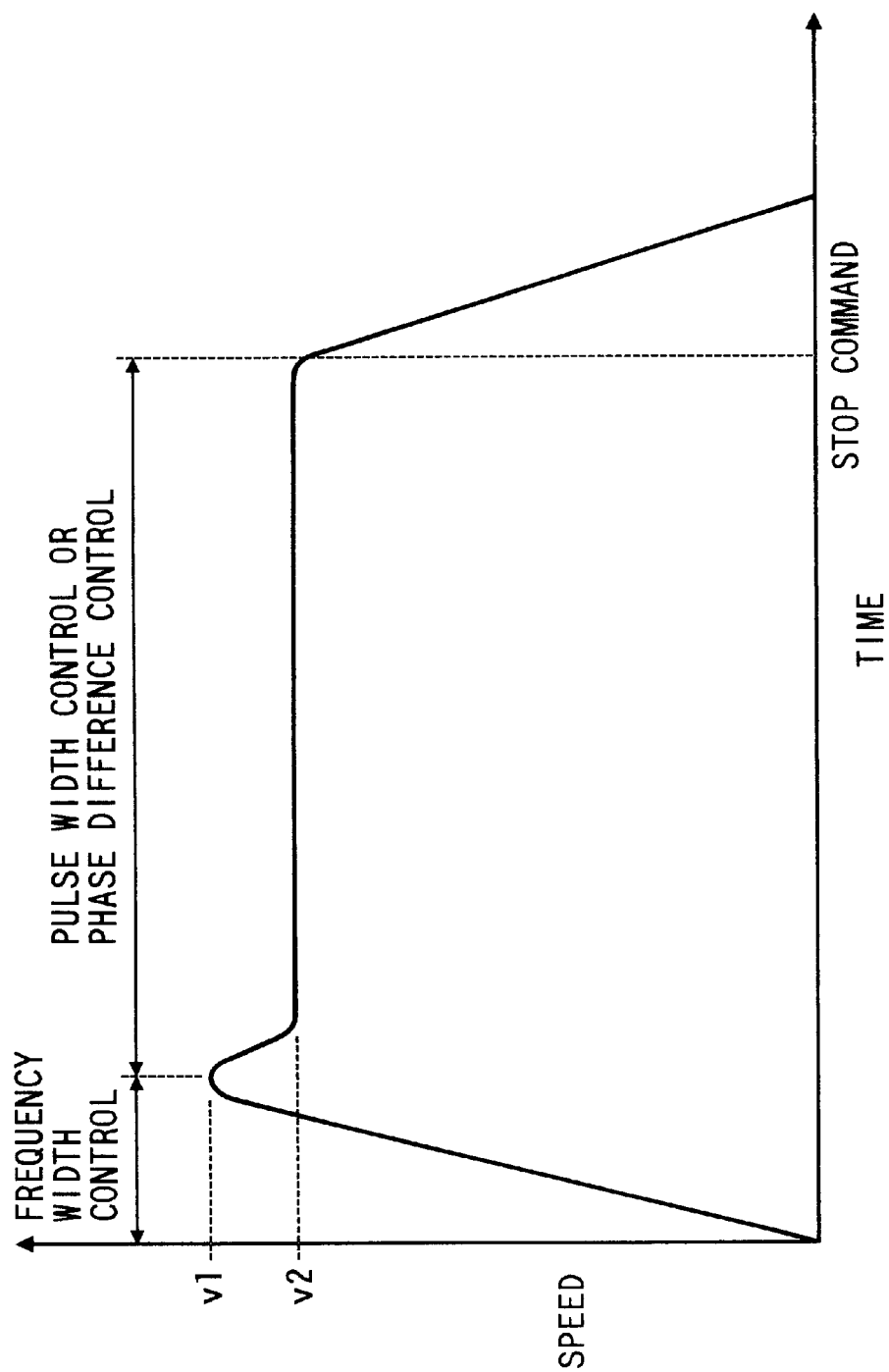
FIG. 6 is a graph showing the relationship between the speed and time of the driving device controlled in accordance with the flow chart of FIG. 1.

FIG. 6 shows the speed profile obtained when the vibration type (wave) motor 3 is controlled according to the first embodiment of the present invention. In the first embodiment of the present invention, since the pulse width upon starting is set at a value with which the maximum output can be obtained from the vibration type (wave) motor, and the frequency is fixed at a speed higher than the target speed, when the speed is controlled by manipulating the pulse width in the steady state, the pulse width does not reach its maximum value, i.e., the control is made while providing a sufficient margin to the pulse width. With this control, even when the frequency resolution is low like in a case wherein output pulses are generated by, e.g., a digital circuit, the frequency need not be changed in the steady state, thus preventing increases in speed drift. That is, both a short start time and speed stability in the steady state can be realized.

In this embodiment, only one driving direction of the vibration type (wave) motor is described. However, when the motor is driven in the opposite direction, the driving pulses input to the A and B phases of the vibration type (wave) motor 3 may be replaced using, e.g., a switch.

In this embodiment, the frequency and pulse width are controlled by software of the microcomputer. Alternatively, a logic circuit, a DSP, or the like may be used in place of the microcomputer to obtain the same effect.

(Second Embodiment)

The second embodiment of the present invention will be described below.

Since the circuit arrangement of a control apparatus for a vibration type driving device in the second embodiment is the same as that in the first embodiment shown in FIG. 2, a detailed description thereof will be omitted. The difference between the first and second embodiments lies in the processing in the microcomputer 6. In the first embodiment, the speed control upon steady driving is attained by manipulating the pulse width. However, in the second embodiment, the speed control upon steady driving is attained by manipulating the phase difference of the driving signals. The operation of the control apparatus for the vibration type driving device according to the second embodiment of the present invention will be described in detail below with reference to the flow chart in FIG. 7.

When a start command of the vibration wave motor is issued in response to an external signal or inside the microcomputer, driving is started in STEP 10.

In STEP 11, a predetermined initial frequency is output to the pulse generator 1. Note that the initial frequency selected in this case assumes a value at which a frequency higher than the resonance frequency of the vibration type (wave) motor 3 is set even when the vibration type (wave) motor 3 suffers individual differences or the temperature, load, or the like has changed, as in the first embodiment.

In STEP 12, 90° as a phase difference at which the vibration type (wave) motor 3 can produce a maximum torque are set in the pulse generator 1 so as to shorten the start time. More specifically, the pulse width data is set at ¼ frequency data. Although not described in the flow chart, the pulse width data to be output to the pulse generator 1 is selected to set a maximum pulse width within the range in which the vibration wave motor is not destroyed.

In STEP 13, data (v) is input from the speed detector 5.

In STEP 14, it is checked if the input speed (v) is larger than a value (v1) set in advance. If NO in STEP 14, the flow advances to STEP 15. Note that v1 is set at a value larger than a final target speed (v2).

In STEP 15, the driving frequency is decreased in accordance with the difference between the input speed (v) and the set value (v1). Since the frequency data of the pulse generator 1 defines the value of the cycle of the driving signal, decreasing the frequency means increasing the frequency data. The processing for changing the frequency data may be attained by adding a value obtained by multiplying v1−v by a certain constant, adding a value determined using a table set in correspondence with the value v1−v, or adding a constant value independently of v1−v. After STEP 15 is executed, the flow returns to STEP 12 to set the phase difference at 90° in correspondence with the changed frequency. The operations from STEP 12 to STEP 15 are executed at predetermined time intervals using timer interrupts or the like produced by the microcomputer.

If YES is determined in STEP 14, the flow advances to STEP 16. The frequency is fixed in this process, and is not changed at a later time.

In STEP 16, speed data (v) is input as in STEP 13.

In STEP 17, the phase difference is controlled based on the difference between the input speed (v) and the target speed (v2). The processing for controlling the phase difference may be attained by multiplication of v2−v and a constant or using a table. As described above, the target speed (v2) is set to be lower than the speed (v1) used as a reference upon fixing the frequency. The relationship between the phase difference and speed has characteristics in which the speed assumes a peak value when the phase difference is 90°. In this case, since changes in speed have equal gradients on both sides larger and smaller than 90°, either side may be used to have 90° as a limit.

In STEP 18, it is checked if an external circuit or the microcomputer has issued a stop command to the vibration wave motor 3. If NO in STEP 18, the flow returns to STEP 16 to continue the speed control; otherwise, driving of the vibration type (wave) motor is stopped.

When the vibration wave motor 3 is controlled according to the second embodiment of the present invention, the speed profile shown in FIG. 6 is obtained as in the first embodiment.

In the second embodiment of the present invention, since the phase difference between the two-phase driving signals upon starting is set at a value with which the maximum output can be obtained from the vibration wave motor, and the driving frequency upon starting is fixed at a speed higher than the target speed, when the speed is controlled by manipulating the phase difference in the steady state, the phase difference does not become 90°, i.e., the control can be made while providing a sufficient margin to the phase difference. With this control, even when the frequency resolution is low like in a case wherein output pulses are generated by, e.g., a digital circuit, the frequency need not be changed in the steady state, thus preventing increases in speed drift. That is, both a short start time and speed stability in the steady state can be realized.

In this embodiment, only one driving direction of the vibration type (wave) motor is described. However, when the motor is driven in the opposite direction, the driving pulses input to the A and B phases of the vibration type (wave) motor 3 may be replaced using, e.g., a switch.

In this embodiment, the frequency and pulse width are controlled by software of the microcomputer. Alternatively, a logic circuit, a DSP, or the like may be used in place of the microcomputer to obtain the same effect.

(Third Embodiment)

Figure 8:
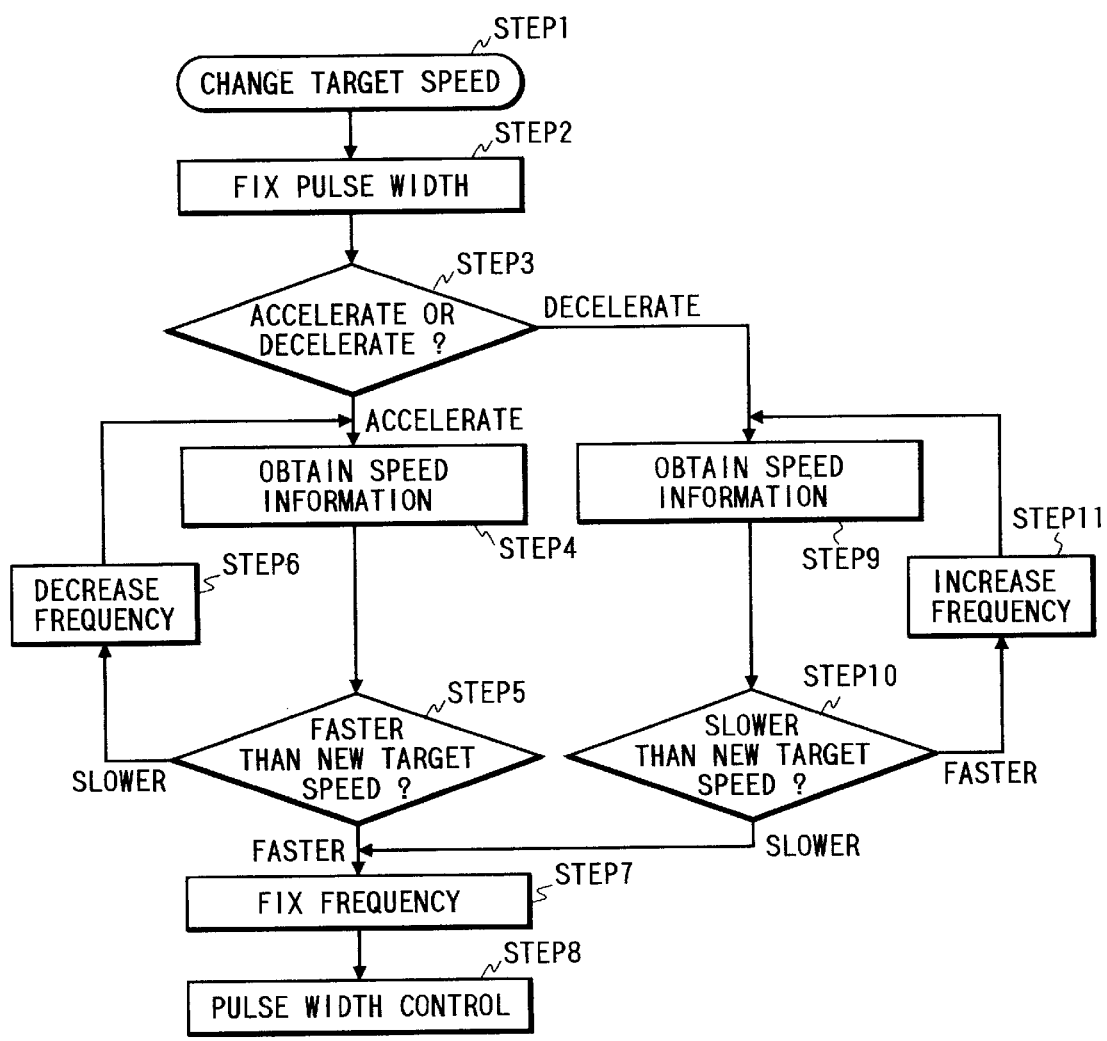
FIG. 8 is a flow chart showing the control operation according to the third embodiment of the present invention.

The third embodiment of the present invention will be described below with reference to FIG. 8. Since the arrangement of a control apparatus of this embodiment is the same as that of the first embodiment, a detailed description thereof will be omitted. Note that FIG. 8 shows the flow executed when the target speed is changed during the speed control of the motor.

More specifically, when the target speed has been changed during driving in which the pulse width (amplitude) is controlled by a conventional method such as a method of fixing the frequency when the speed of the vibration type (wave) motor 3 has reached a required speed upon sweeping the frequency, and then changing the pulse width, a method of determining the frequency on the basis of the predetermined relationship between the frequency and speed of the vibration type (wave) motor 3, and then changing the pulse width, and the like, the control enters the speed control data determination routine in STEP 1.

In STEP 2, the pulse width of the driving pulses (i.e., the amplitude of alternating current wave driving signals) is fixed at the pulse width at that time, i.e., at the time of changing the target speed.

In STEP 3, it is checked whether the target speed is changed to accelerate or decelerate the motor. If the target speed is changed to accelerate the motor, the flow advances to STEP 4 to acquire speed information from the speed detector 5, and the flow then advances to STEP 5.

In STEP 5, it is checked if the detected speed acquired in STEP 4 is faster than the new target speed. If the detected speed is slower than the new target speed, the flow advances to STEP 6 to decrease the frequency of the driving pulses to make the driving frequency approach the resonance frequency, thereby increasing the driving speed of the vibration type (wave) motor 3.

Note that the frequency may be decreased by either a method of decreasing the frequency based on the difference between the detected speed and a predetermined speed, or a method of subtracting a constant value independently of the detected speed.

If it is determined in STEP 5 that the new target speed is faster than the detected speed, the flow advances to STEP 7.

On the other hand, if it is determined in STEP 3 that the target speed is changed to decelerate the motor, the flow advances to STEP 9 to acquire speed information from the speed detector 5, and the flow then advances to STEP 10.

In STEP 10, it is checked if the detected speed acquired in STEP 9 is slower than the new target speed. If the detected speed is faster than the new target speed, the flow advances to STEP 11 to increase the frequency to make the driving frequency separate from the resonance frequency, thereby decreasing the driving speed of the vibration type (wave) motor 3.

Note that the frequency may be increased by either a method of increasing the frequency based on the difference between the detected speed and a predetermined speed, or a method of adding a constant value independently of the detected speed.

If it is determined in STEP 10 that the detected speed is slower than the new target speed, the flow advances to STEP 7.

In STEP 7, the frequency of the driving pulses is fixed. This frequency assumes an optimal value with respect to the new target speed in STEPs 4, 5, and 6 or STEPs 9, 10, and 11.

In STEP 8, speed control (pulse width control) is made by manipulating the pulse width of the driving pulses while the frequency is fixed. More specifically, although not described in the flow chart, the processing for fetching speed information and changing the pulse width in accordance with the difference between the fetched speed and the target speed, or the like is executed.

Thereafter, the pulse width control continues until the target speed is changed again. When the target speed has been changed, the flow returns to STEP 1 to change the frequency.

With this speed control, when the target speed has been changed during driving of the vibration type (wave) motor 3, the driving frequency is changed to an optimal value to make the speed quickly approach the target speed. After the frequency is determined, the speed can reliably and stably be made to substantially attain the target speed by manipulating the pulse width (amplitude).

(Fourth Embodiment)

Figure 9:
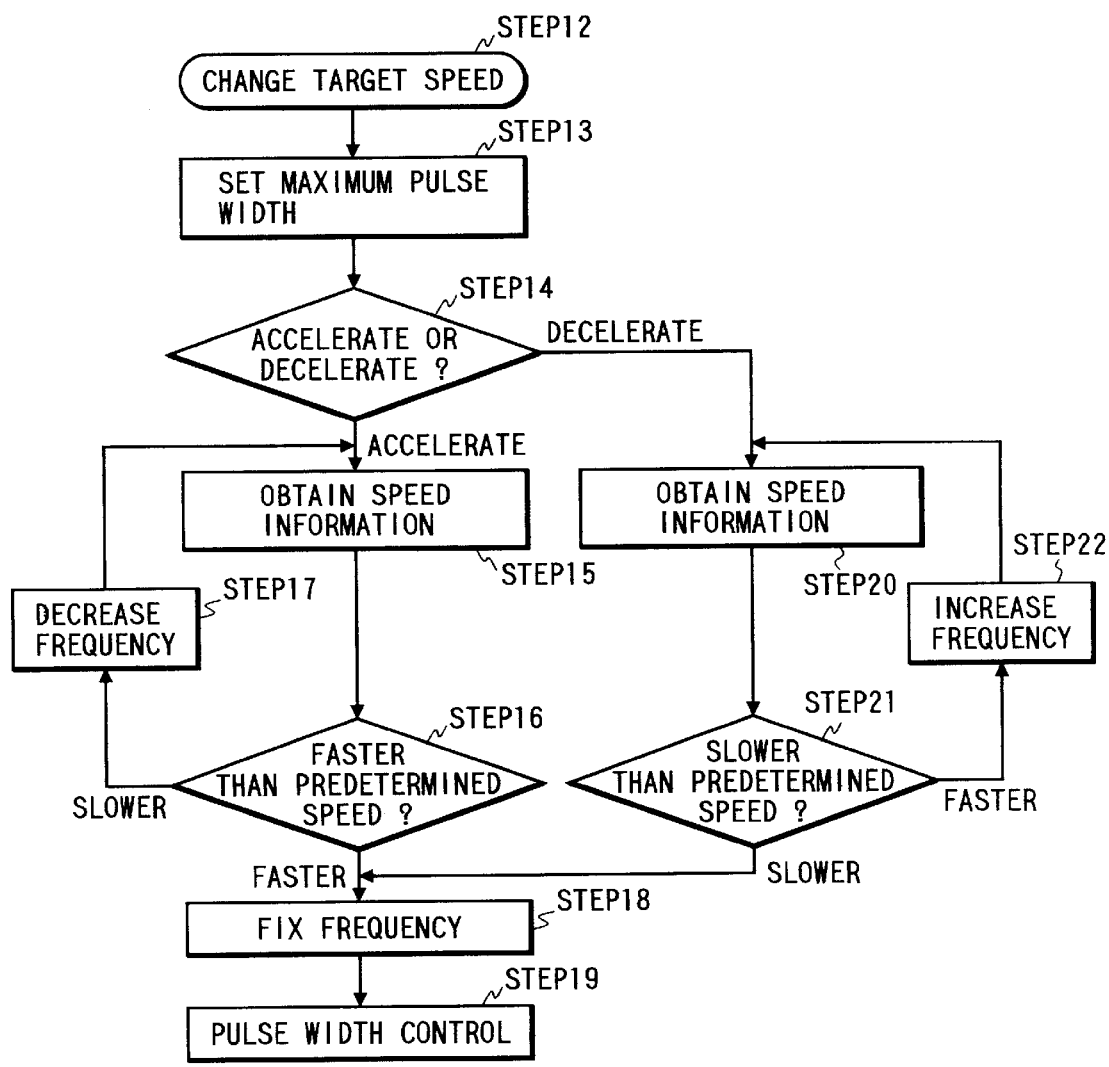
FIG. 9 is a flow chart showing the control operation according to the fourth embodiment of the present invention.
Figure 10:
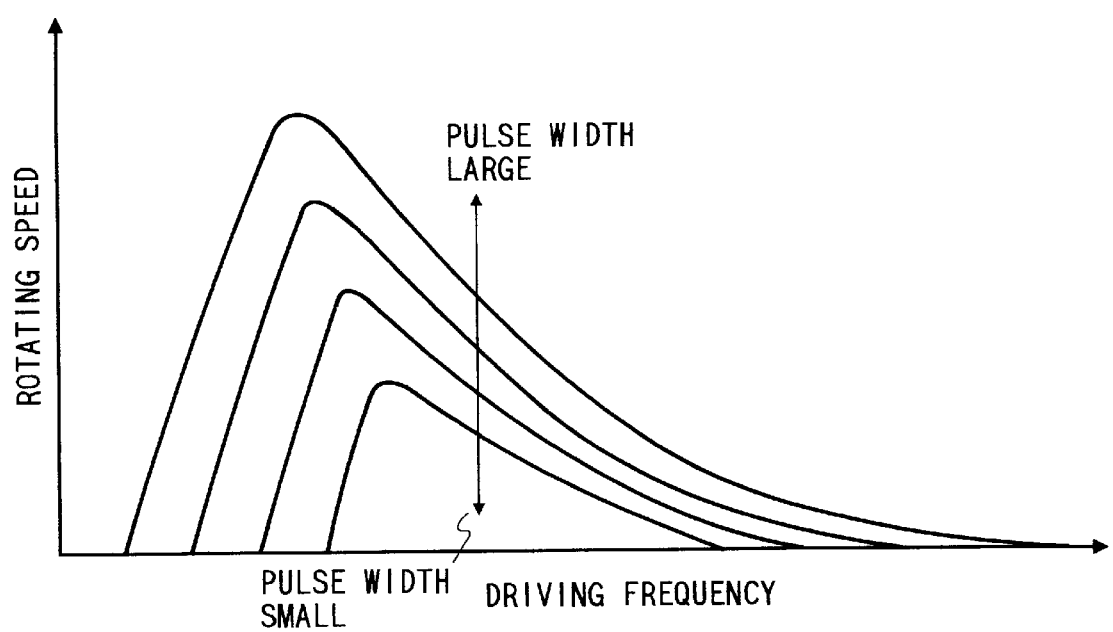
FIG. 10 is a graph for explaining the characteristics of a vibration wave motor.

FIG. 9 is a flow chart showing the speed control operation of a control circuit according to the fourth embodiment of the present invention. In the third embodiment, the pulse width of the driving pulses is fixed at the pulse width (amplitude) at the time of changing the target speed. However, since the characteristics of the vibration type (wave) motor change as the pulse width changes, as shown in FIG. 10, the pulse width upon accelerating or decelerating the motor need be constant to always attain similar acceleration and deceleration. To achieve this, this embodiment improves the control method to always attain constant acceleration and deceleration.

According to the result of an experiment conducted by the present applicant, it is preferable to set the pulse width at a largest possible value upon acceleration and deceleration. As the pulse width upon acceleration is larger, smoother acceleration can be attained, and if the pulse width upon driving the motor at low speed is small, the motor is driven unstably due to the presence of a dead zone with respect to the voltage of the vibration wave motor. Note that the arrangement of the control circuit is the same as that of the first embodiment.

When the target speed has been changed during the pulse width control of the vibration type (wave) motor 3, the control enters the speed control routine in STEP 12.

In STEP 13, the pulse width is set at the maximum value. Note that the maximum value means a pulse width that maximizes the output of the vibration type (wave) motor 3 within the range in which the vibration type (wave) motor 3 and the transformer 2 are not destroyed.

In STEP 14, it is checked whether the target speed is changed to accelerate or decelerate the motor. If the target speed is changed to accelerate the motor, the flow advances to STEP 15 to acquire speed information from the speed detector 5, and the flow then advances to STEP 16.

In STEP 16, it is checked if the speed information acquired in STEP 15 is faster than a predetermined speed. Note that the predetermined speed is set at a proper value larger than the new target speed. The reason why the predetermined speed is set at a value larger than the new target speed is that the speed cannot be increased by manipulating the pulse width after the frequency is fixed since the pulse width upon manipulating the frequency assumes a maximum value. More specifically, upon manipulating the pulse width so that the speed reaches the target speed after the frequency is fixed, the pulse width is decreased to some extent, and when the load acts or an environmental factor such as temperature changes, the pulse width is increased to maintain the target speed.

If it is determined in STEP 16 that the detected speed is slower than the predetermined speed, the flow advances to STEP 17 to decrease the frequency to make it approach the resonance frequency, thereby increasing the speed of the vibration wave motor 3.

Note that the frequency may be decreased by either a method of decreasing the frequency based on the difference between the detected speed and a predetermined speed, or a method of subtracting a constant value independently of the detected speed.

If it is determined in STEP 16 that the detected speed is faster than the predetermined speed, the flow advances to STEP 18.

On the other hand, if it is determined in STEP 14 that the target speed is changed to decelerate the motor, the flow advances to STEP 20 to acquire speed information from the speed detector 5, and the flow then advances to STEP 21.

In STEP 21, it is checked if the detected speed is slower than a predetermined speed. Note that the predetermined speed is set at a value larger than the new target speed for the same reason as in STEP 16.

If the detected speed is faster than the predetermined speed, the flow advances to STEP 22 to decrease the frequency to make it separate from the resonance frequency, thereby decreasing the speed of the vibration type (wave) motor 3.

Note that the frequency may be increased by either a method of increasing the frequency based on the difference between the detected speed and a predetermined speed, or a method of adding a constant value independently of the detected speed.

If it is determined in STEP 21 that the detected speed is slower than the predetermined speed, the flow advances to STEP 18.

In STEP 18, the frequency of the driving pulses is fixed. Thereafter, as in the third embodiment, the pulse width of the driving pulses is manipulated to control the speed to make it substantially match the new target speed. The pulse width control continues until the target speed is changed again. When the target speed has been changed, the flow returns to STEP 12 to change the frequency.

With this control, when the target speed has been changed during driving of the vibration type (wave) motor 3, the driving frequency can be quickly set at an optimal value with similar acceleration/deceleration, and after the frequency is determined, reliable, stable speed control can be realized by manipulating the pulse width.

(Fifth Embodiment)

Figure 11:
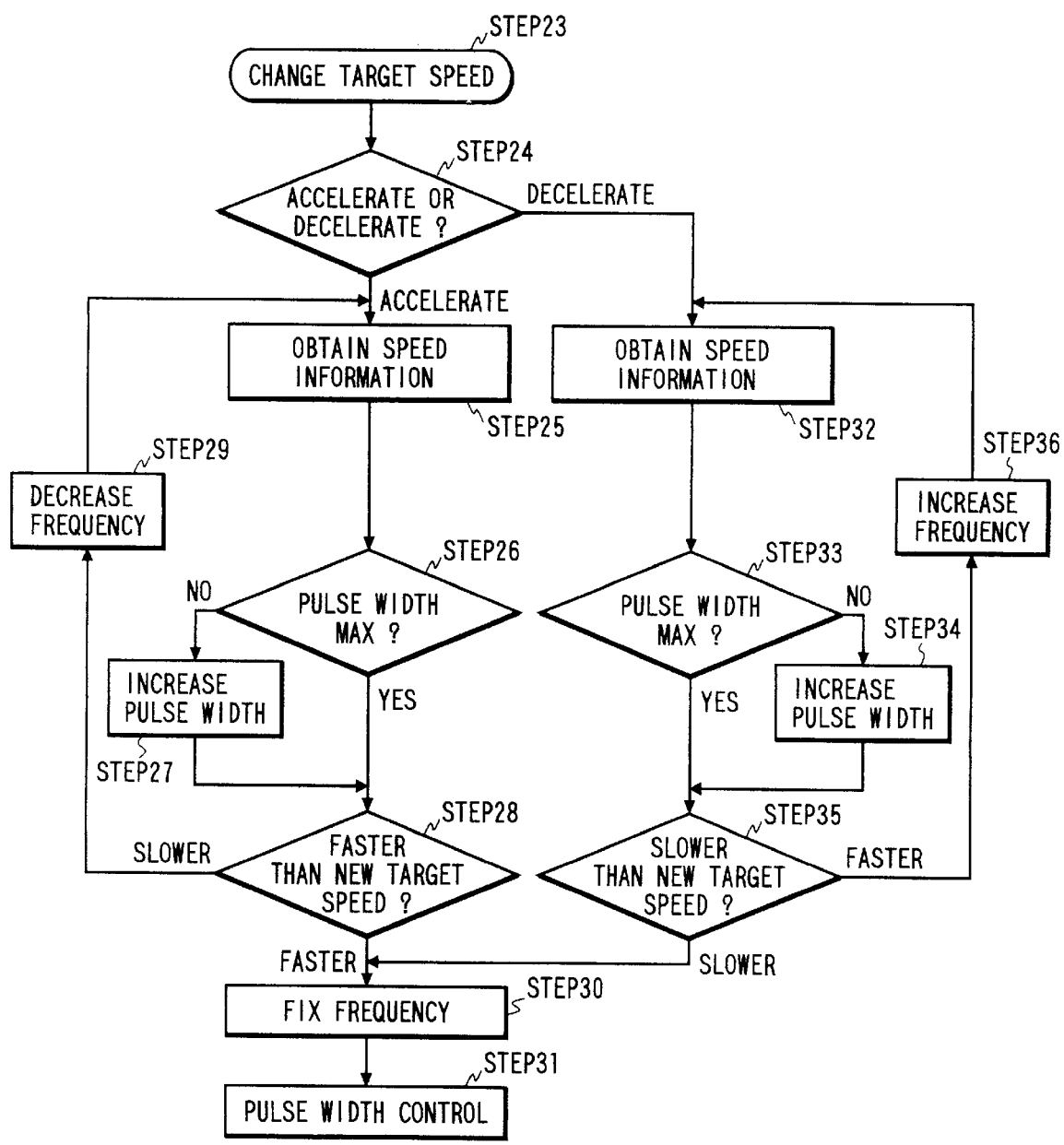
FIG. 11 is a flow chart showing the control operation according to the fifth embodiment of the present invention.

FIG. 11 is a flow chart showing the speed control operation of a control circuit according to the fifth embodiment of the present invention. In the fourth embodiment, when the target speed has been changed, the pulse width is changed to a maximum value, and thereafter, the frequency is manipulated. However, if the pulse width immediately after the target speed has been changed assumes a small value, if the pulse width is changed to the maximum value, the speed of the vibration wave motor increases abruptly, thus producing noise or applying stress on the load.

This embodiment improves the above embodiment to solve such problem, and allows stable acceleration/deceleration without abruptly changing the speed of the vibration type (wave) motor. Note that the arrangement of the control circuit is the same as that of the first embodiment.

When the target speed has been changed during the pulse width control of the vibration type (wave) motor 3, the control enters the speed control routine in STEP 23.

In STEP 24, it is checked whether the target speed is changed to accelerate or decelerate the motor. If the target speed is changed to accelerate the motor, the flow advances to STEP 25 to acquire speed information (detected speed) from the speed detector 5, and the flow then advances to STEP 26.

In STEP 26, it is checked if the pulse width has a maximum value. If NO in STEP 26, the flow advances to STEP 27 to increase the pulse width. Note that the maximum value means a pulse width that maximizes the output of the vibration type (wave) motor 3 within the range in which the vibration type (wave) motor 3 and the transformer 2 are not destroyed. The increment of the pulse width in STEP 27 is a constant value within the range in which the speed does not change abruptly. The flow advances from STEP 27 to STEP 28.

In STEP 28, it is checked if the detected speed is faster than a predetermined speed that is, in turn, faster than the new target speed. If the detected speed is slower than the predetermined speed, the flow advances to STEP 29 to decrease the frequency to make it approach the resonance frequency. The flow then returns from STEP 29 to STEP 25.

In this manner, the operations from STEP 25 to STEP 29 are repeated until it is determined in STEP 28 that the detected speed is faster than the predetermined speed, and thereafter, the flow advances to STEP 30.

On the other hand, if it is determined in STEP 24 that the target speed is changed to decelerate the motor, the flow advances to STEP 32 to acquire speed information from the speed detector 5, and the flow then advances to STEP 33.

In STEP 33, it is checked if the pulse width has a maximum value. If NO in STEP 33, the flow advances to STEP 34 to increase the pulse width. Note that the increment of the pulse width in STEP 34 is a constant value within the range in which the speed does not change abruptly. The flow then advances from STEP 34 to STEP 35.

In STEP 35, it is checked if the detected speed is slower than a predetermined speed faster than the new target speed. If the detected speed is faster than the predetermined speed, the flow advances to STEP 36 to increase the frequency to make it separate from the resonance frequency. The flow then returns from STEP 36 to STEP 32.

In this manner, the operations from STEP 32 to STEP 36 are repeated until it is determined in STEP 35 that the detected speed is slower than the predetermined speed, and thereafter, the flow advances to STEP 30.

In STEP 30, the frequency is fixed. In STEP 31, the speed is controlled to make it substantially match the target speed by manipulating the pulse width. Thereafter, when the target speed has been changed again, the flow returns to STEP 23 to change the frequency.

With this control, when the target speed has been changed during driving of the vibration type (wave) motor 3, the driving frequency can be quickly set at an optimal value with similar acceleration/deceleration without applying any stress to the load connected to the vibration wave motor 3 or producing any noise. Furthermore, after the frequency is determined, reliable, stable speed control can be realized by manipulating the pulse width.

Note that the third, fourth, and fifth embodiments describe only the method of changing the speed with respect to the frequency and pulse width. However, the actual command to be supplied to the pulse generator 1 is output to decrease the frequency data shown in FIG. 3 when the frequency is to be increased, and phase difference data for the frequency at that time is also output.

In each of the above embodiments, the pulse width of the driving pulses is changed. In place of the pulse width, the phase difference between the two-phase driving signals may be changed to attain speed control, thus attaining the same effects. In this case, the phase difference that allows the vibration wave motor 3 to generate a maximum output is 90° and −90°.

(Sixth Embodiment)

Figure 12:
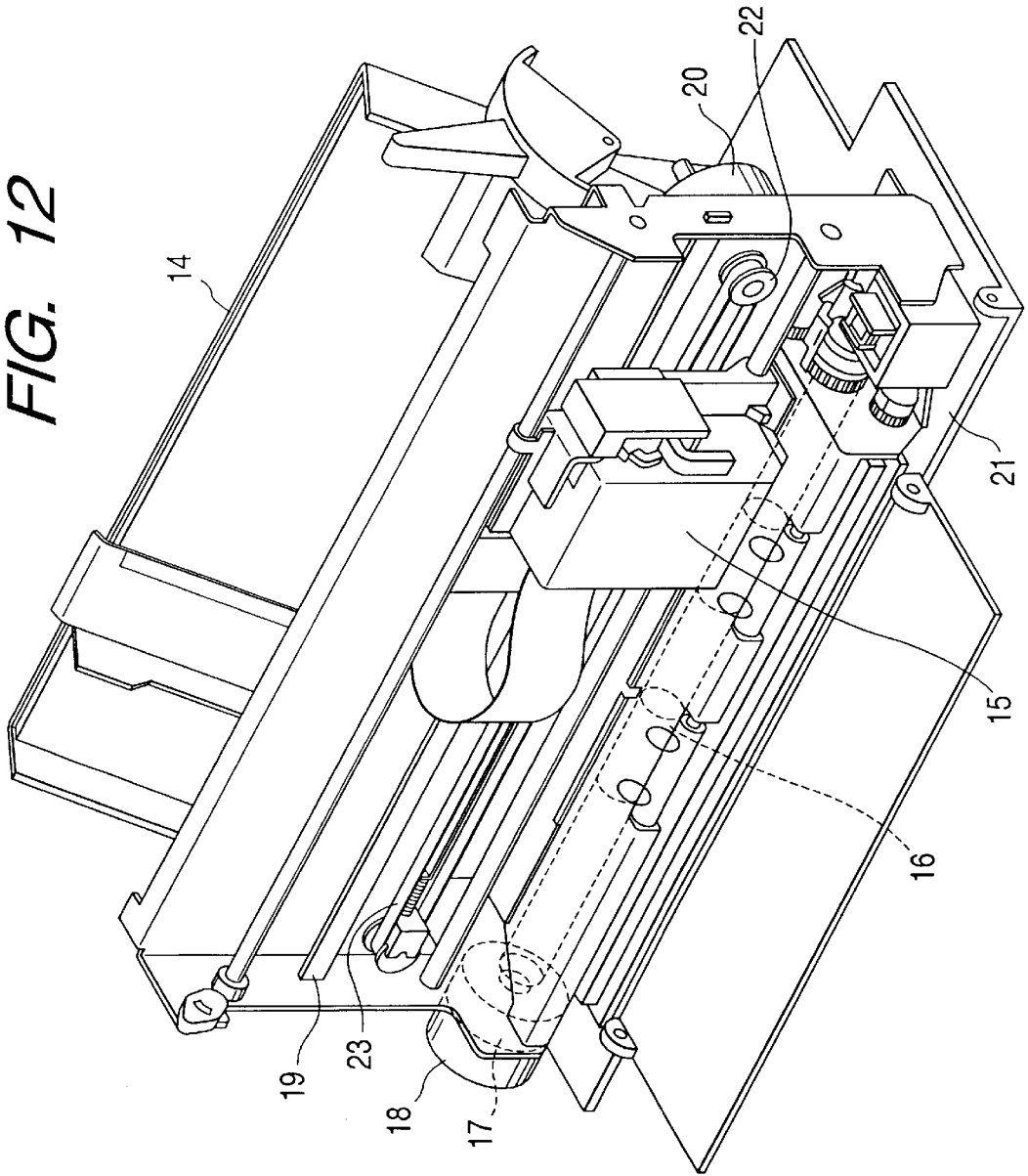
FIG. 12 is a perspective view showing a printer that uses a control circuit according to the sixth embodiment of the present invention.

FIG. 12 shows a thermal jet printer that uses a control circuit according to the sixth embodiment of the present invention. In FIG. 12, a sheet feeder 14 serves to pick up a plurality of sheets stacked therein one by one, and to feed the picked-up sheet to a sheet feed system.

A carriage 15 moves an ink head in the main scanning direction. Recording onto a paper sheet is attained by ejecting ink expanded by heat from a large number of nozzles arranged at the end of the ink head.

A platen roller 16 feeds the sheet fed from the sheet feeder 14.

A sheet feed vibration type (wave) motor 17 has an output shaft directly connected to the platen roller 16, and serves as a driving source for feeding the paper sheet.

A rotary encoder 18 is connected to the output shaft of the sheet feed vibration wave motor 17, and detects the rotation angle of the sheet feed vibration wave motor 17.

A linear scale 19 is formed with a plurality of fine density patterns. A photocoupler (not shown) attached to the carriage 15 detects the density patterns to detect the moving amount of the carriage 15.

A carriage driving vibration type (wave) motor 20 drives a belt 23 via a pulley 22 to drive the carriage 15 attached to the belt 23.

A recovery system 21 draws ink by suction to prevent the nozzles of the ink head attached to the carriage 15 from clogging with dried ink.

Some of the documents to be printed by the printer have no characters on the central portion of the paper sheet, as shown in FIG. 13. The carriage 15 must be moved at a predetermined speed during printing since the ejection frequency of the ink head is limited. However, the carriage 15 is preferably moved at higher speed in a non-printing region to shorten the print time. Thus, when a document shown in FIG. 13 is to be printed, the speed of the carriage driving vibration type (wave) motor 20 must be changed during printing.

Figure 14:
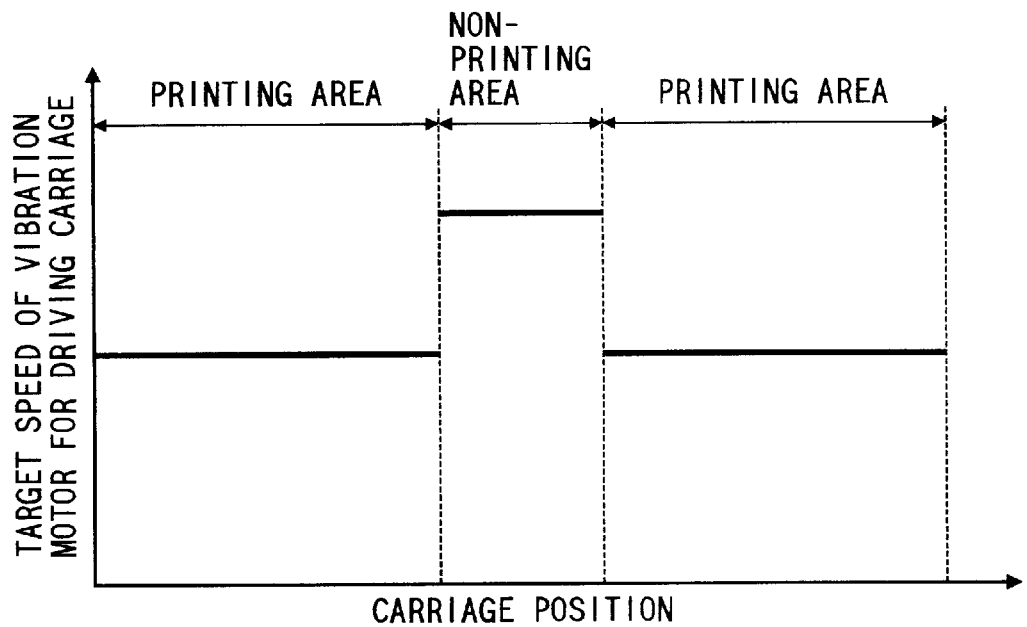
FIG. 14 is a chart showing the driving pattern of the carriage of the printer.

FIG. 14 shows changes in target speed in correspondence with changes in carriage position in this case. As shown in FIG. 14, the motor is temporarily accelerated at the central portion without any characters of the paper sheet, and is decelerated again to perform printing when the carriage reaches a character portion, thus realizing high-speed printing while maintaining high print quality. When the target speed has been changed during driving (after printing is started) of the carriage driving vibration type (wave) motor 20 in this manner, the motor 20 is controlled by the method described in one of the third to fifth embodiments.

On the other hand, the sheet feed vibration type (wave) motor 17 feeds the paper sheet by one line upon completion of printing for one line by scanning the carriage 15. When it is detected based on the signal from the rotary encoder 18 that the paper sheet has been fed by one line, the sheet feed vibration type (wave) motor 17 stops the paper sheet by setting the applied voltage at zero.

After feeding is stopped, the sheet position is maintained by the holding force of the sheet feed vibration type (wave) motor 17. In the serial printer shown in FIG. 11, the sheet feed quantity precision has a large influence on the print precision. According to an experiment conducted by the present applicant, the precision of the sheet stop position can be improved by lowering the speed of the sheet feed vibration type (wave) motor 17 immediately before feeding is stopped. However, when the sheet is fed at low speed from the beginning to end, the print time becomes long.

Figure 15:
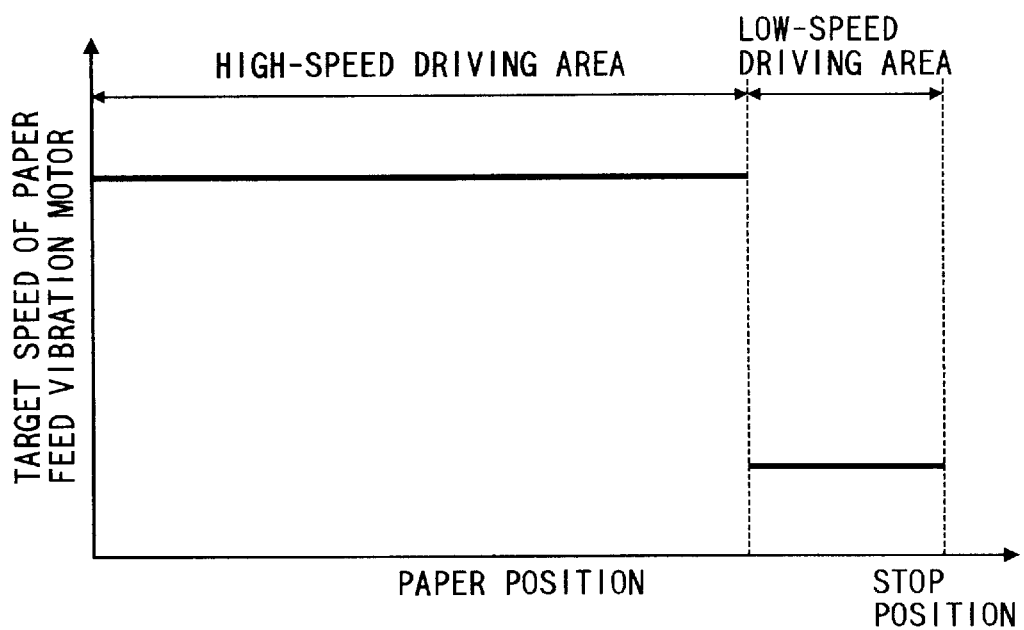
FIG. 15 is a chart showing the paper feed pattern of the printer.

In view of this problem, as shown in FIG. 15, the sheet is fed at high speed at the beginning of sheet feeding, and is fed at low speed from a position immediately before the stop position, thus realizing high-speed printing while maintaining high print quality.

When the target speed is changed during driving (after sheet feeding is started) of the sheet feed vibration type (wave) motor 17, the motor 17 is also controlled by the method described in one of the third to fifth embodiments.

(Seventh Embodiment)

Figure 17:
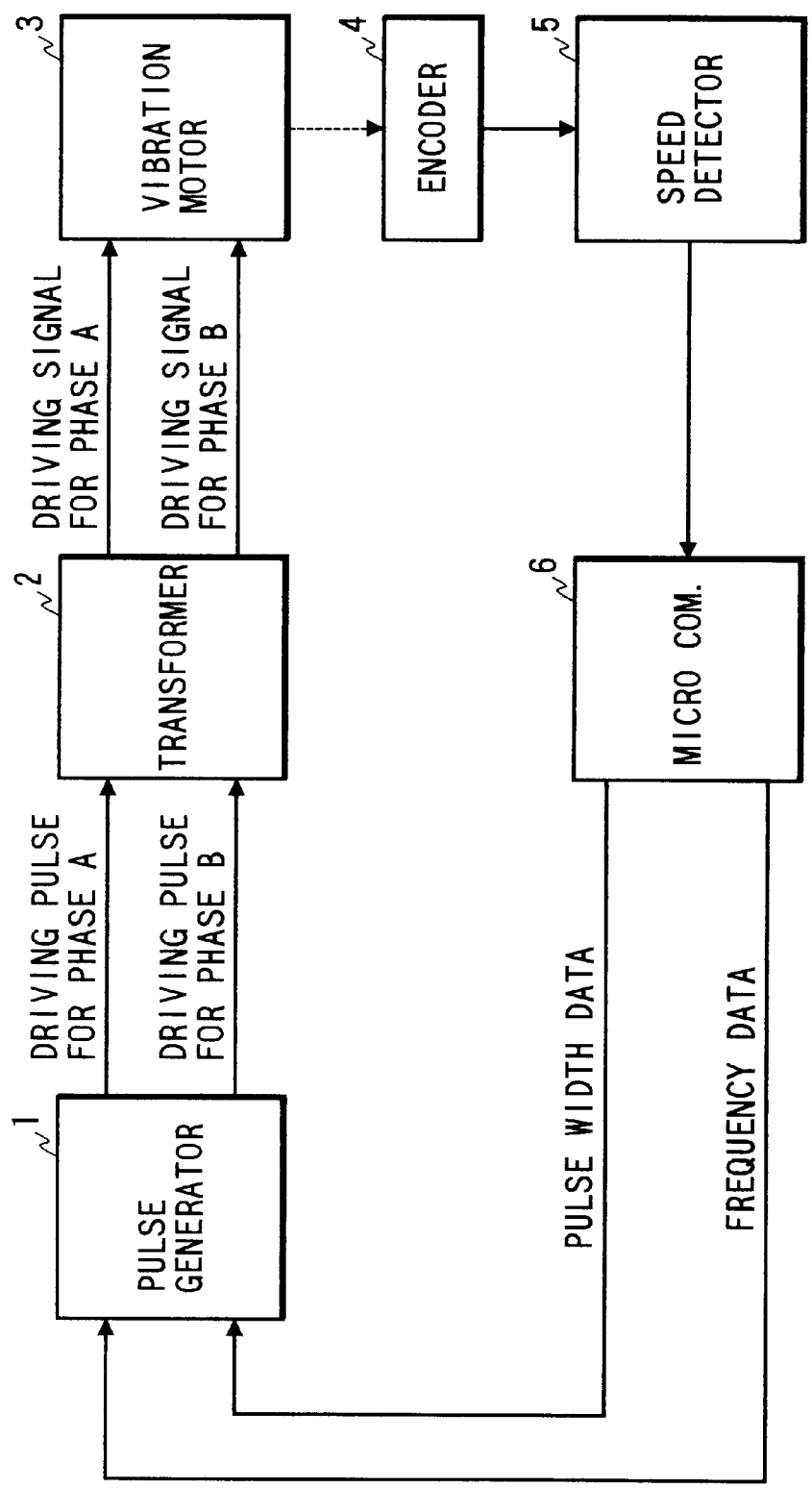
FIG. 17 is a block diagram showing a controller used in the seventh embodiment.

FIG. 17 is a block diagram showing a control circuit of the seventh embodiment in which the present invention is applied to a vibration wave motor. The control circuit according to the seventh embodiment of the present invention will be described below with reference to FIG. 17.

Figure 18:
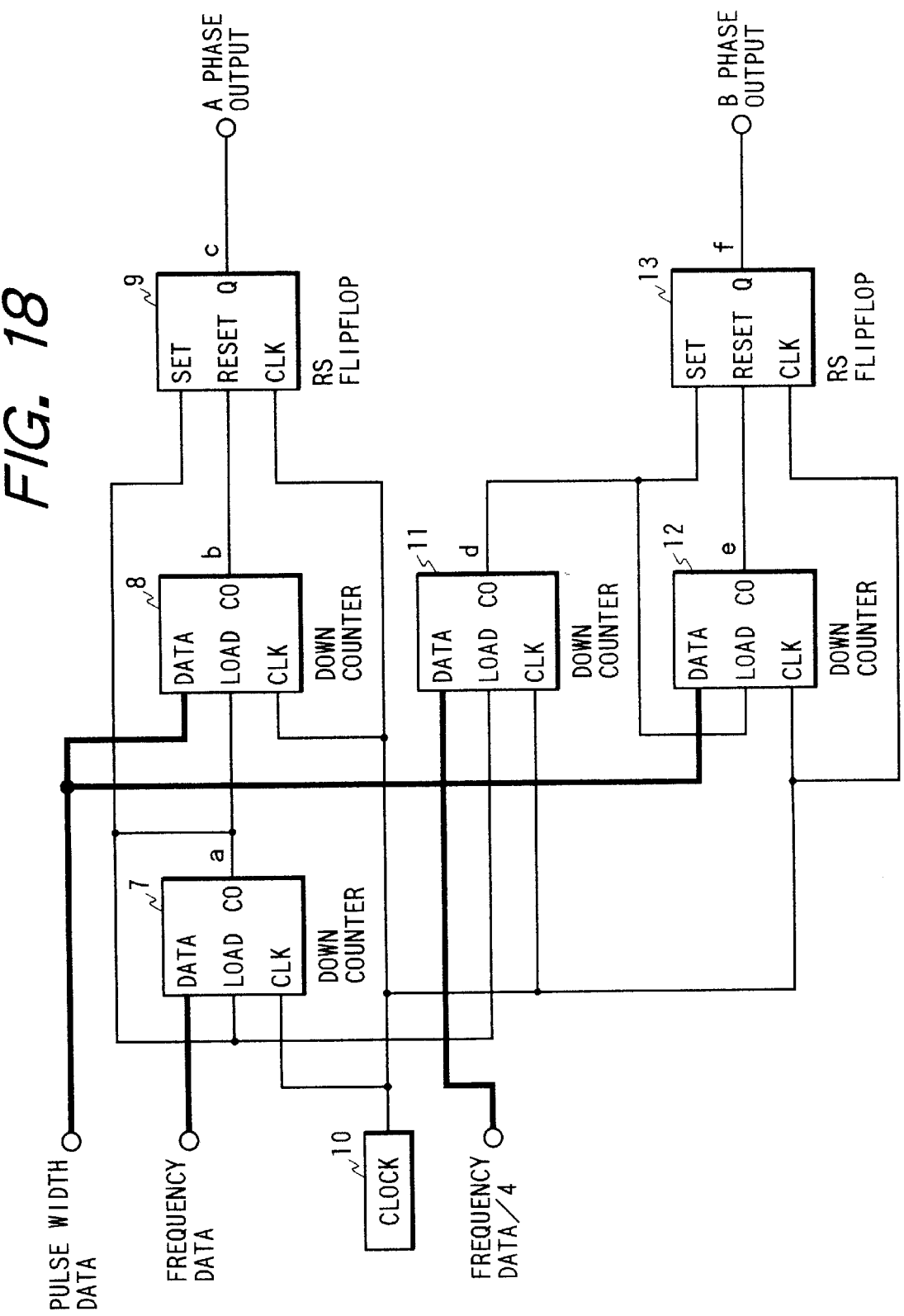
FIG. 18 is a block diagram showing the internal circuit of a pulse generator shown in FIG. 17.

Referring to FIG. 17, a pulse generator 1 outputs two-phase pulses for two phases in correspondence with input frequency data and pulse width data. FIG. 18 is a circuit diagram showing the internal arrangement of the pulse generator 1. A clock generator 10 generates reference timings of this circuit. A down counter 7 loads data consisting of a plurality of bits, which is input to its DATA terminal, when the input to its LOAD terminal changes to high level. When the data of the down counter becomes 0, the counter outputs a high-level signal from its CO terminal.

Figure 19:
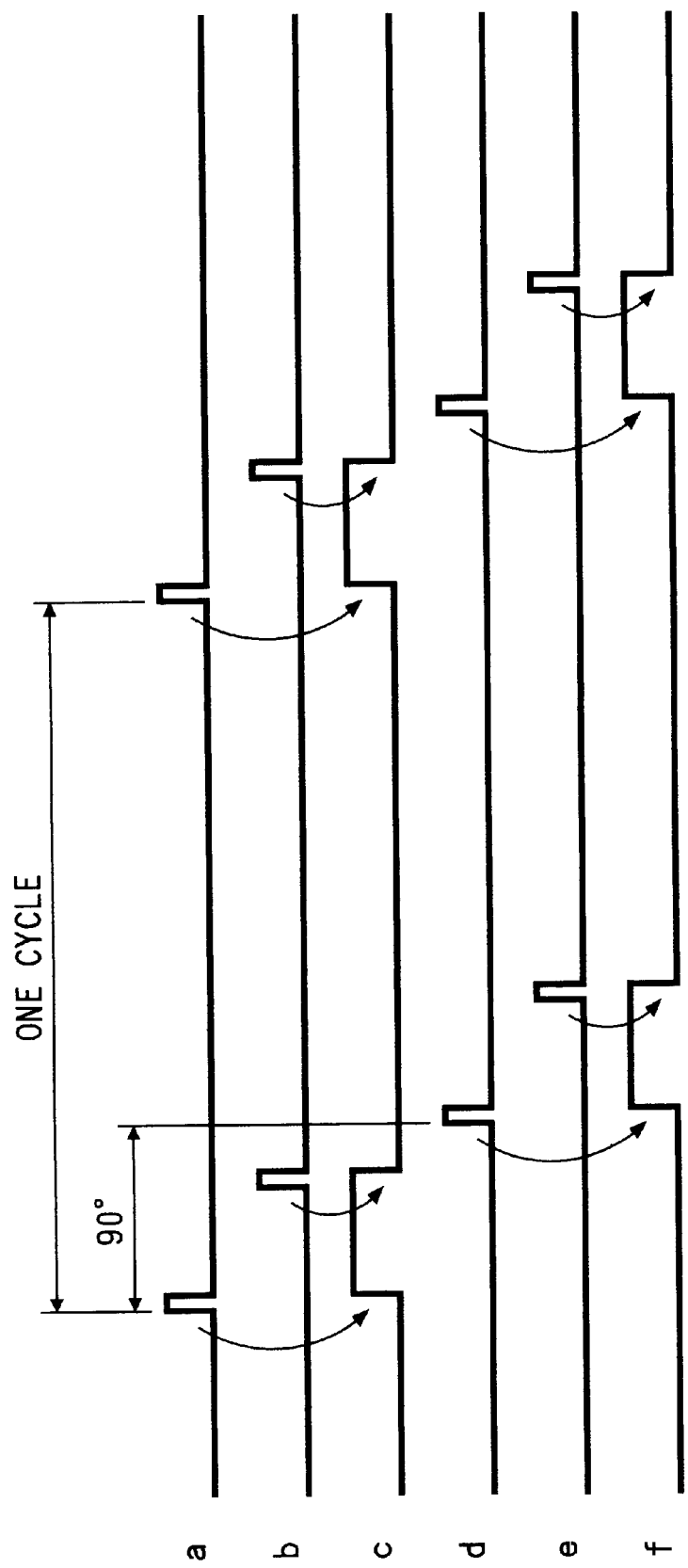
FIG. 19 is a timing chart showing the operation of the pulse generator shown in FIG. 17.

FIG. 19 is a timing chart showing the states of the individual signals in the circuit shown in FIG. 18. Since the CO terminal of the down counter 7 is connected to its LOAD terminal, the output from the down counter 7 changes to high level for a one-clock period when the count value becomes zero to have frequency data as one cycle, as indicated by a in FIG. 19.

A down counter 8 in FIG. 18 has a function similar to that of the down counter 7. Since the CO output of the down counter 7 is connected to the LOAD input of the down counter 8, the down counter 8 loads pulse width data for each cycle of the driving pulses, and the CO output of the down counter 8 changes to high level after a time corresponding to the pulse width data lapses, as indicated by b in FIG. 19.

The Q output of an RS flip-flop 9 in FIG. 18 goes high when its SET input goes high, and goes low when its RESET input goes high. Since the CO output of the down counter 7 is connected to the SET input of the RS flip-flop 9 and the CO output of the down counter 8 is connected to the RESET input thereof, the Q output generates pulses which have the frequency data as one cycle, and change to high level for a time corresponding to the pulse width data, as indicated by c in FIG. 19. Such pulses serve as A phase outputs. The RS flip-flop 9 changes in synchronism with the leading edge of the clock input.

A down counter 11 in FIG. 18 determines the phase difference. Since the CO output of the down counter 7 is connected to the LOAD input of the down counter 11, the CO output of the down counter 11 changes to high level with a delay corresponding to the input data after the down counter 7. Since the ideal time phase difference between two phases (A and B phases) to be applied to a vibration wave motor is 90° or −90°, the phase difference data is set at a value ¼ the frequency data. In this case, the CO output of the down counter 11 changes, as indicated by d in FIG. 19. As in the A phase, the CO output of a down counter 12 similarly changes, as indicated by e in FIG. 19, and the Q output of an RS flip-flop 13 changes, as indicated by f in FIG. 19.

As a consequence, the pulse generator 1 shown in FIG. 17 outputs two-phase pulses, which have the frequency data as one cycle, a pulse width corresponding to the pulse width data, and a phase difference of 90° therebetween.

Referring back to FIG. 17, a booster circuit 2 uses a transformer, an LC resonance circuit, or the like with the arrangement shown in FIG. 5.

A vibration type (wave) motor 3 has a known structure, and generates travelling waves in a stator by applying, to two-phase electrodes, alternating current signals having a time phase difference of 90° therebetween at a frequency near the resonance frequency of the stator, thereby rotating a rotor in press-contact with the stator.

An encoder 4 is attached to the output shaft of the vibration type (wave) motor 3, and outputs pulses corresponding to the rotation angle by optically or magnetically detecting the angle.

A speed detector 5 measures and outputs the frequency of pulses output from the encoder 4.

A microcomputer 6 determines various data for the pulse generator 1 on the basis of data obtained from the speed detector 5.

Figure 16:
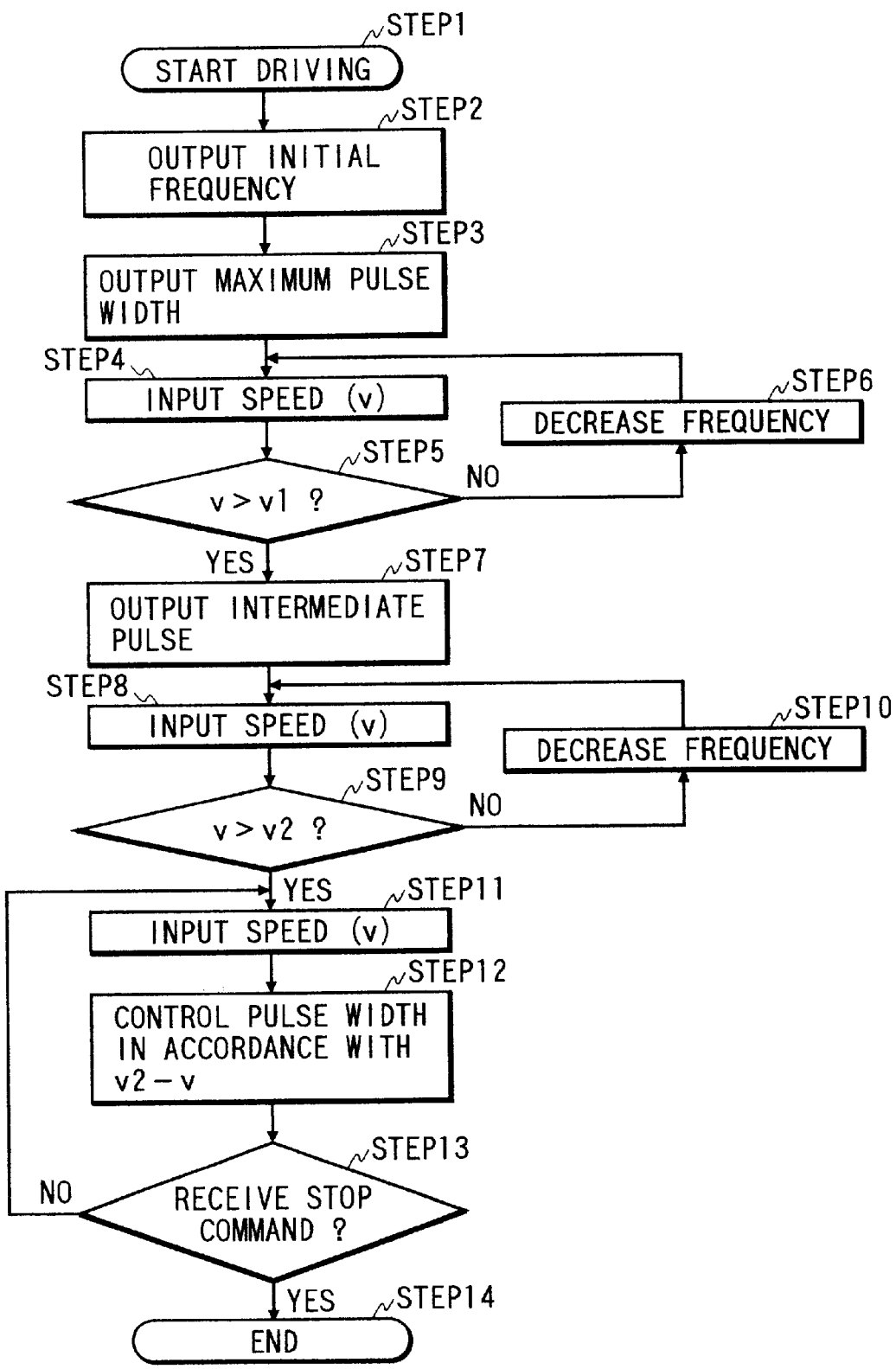
FIG. 16 is a flow chart showing the seventh embodiment of the present invention.

FIG. 16 is a flow chart showing the control method by the microcomputer 6. The operation according to the seventh embodiment of the present invention will be described in detail below with reference to FIG. 16.

In the following description of FIG. 16, v2 represents the target speed as a steady speed, and v1 represents a predetermined speed as a non-steady speed slower than v2. Note that the steady speed and the non-steady speed, which is not used in practice, are determined depending on the device to be used.

When the start command of the vibration type (wave) motor is issued in response to an external signal or inside the microcomputer, driving is started in STEP 1.

In STEP 2, a predetermined initial frequency is output to the pulse generator 1. Note that the initial frequency selected in this case assumes a value at which a frequency higher than the resonance frequency of the vibration type (wave) motor 3 is set even when the vibration wave motor 3 suffers individual differences or the temperature, load, or the like has changed. This is because the frequency-speed characteristics of the vibration wave motor have gradients in opposite directions to have the resonance frequency as a boundary, and since the gradient becomes extremely steep at frequencies lower than the resonance frequency, control cannot be made stably.

In STEP 3, a maximum pulse width within the range in which the vibration wave motor 3 or transformer 2 is not destroyed is set in the pulse generator 1 as pulse width data. This is to shorten the start time since the pulse width is selected to allow the vibration type (wave) motor 3 to generate a maximum torque upon starting. However, when an excessively large pulse width is set, the circuit element such as a switching element in the transformer 2 and the vibration wave motor may be destroyed. For this reason, the pulse width must be set in consideration of safety of these circuits.

In STEP 4, data (v) is input from the speed detector 5.

In STEP 5, it is checked if the input speed (v) is larger than a predetermined value (v1) smaller than the target speed (v2). If NO in STEP 5, the flow advances to STEP 6.

In STEP 6, the driving frequency is decreased. When the acceleration is to be increased, the decrement of the frequency is set to be large; otherwise, the decrement is set to be small. Since the frequency data of the pulse generator 1 defines the value of the cycle of the driving signal, decreasing the frequency means increasing the frequency data. After STEP 6 is executed, the flow returns to STEP 4. The operations from STEP 4 to STEP 6 are executed at predetermined time intervals using timer interrupts or the like produced by the microcomputer, although not shown.

If it is determined in STEP 5 that the driving speed (v) has reached the predetermined speed (v1), the flow advances to STEP 7. In STEP 7, the pulse width is set at an intermediate value smaller than the maximum value.

In STEP 8 to STEP 10, the frequency is decreased until the driving speed reaches the target speed (v2). The pulse width at this time is the intermediate one set in STEP 7. Although not shown, the operations from STEP 8 to STEP 10 are also executed at predetermined time intervals using timer interrupts or the like produced by the microcomputer.

If it is determined in STEP 9 that the driving speed has reached the target speed (v2), the flow advances to STEP 11. In STEP 11, data is input from the speed detector 5.

In STEP 12, the difference (v2−v) between the input speed (v) and the target speed is fed back to manipulate the pulse width, thus controlling the speed.

If it is determined in STEP 13 that a stop command of the vibration wave motor is issued in response to an external signal or inside the microcomputer, the pulse generation is stopped, thus ending the processing.

During the operation from STEP 11 to STEP 13 described above, the frequency is fixed at a value finally set in STEP 10. Also, the operations from STEP 11 to STEP 13 are executed at predetermined time intervals using timer interrupts or the like produced by the microcomputer, although not shown.

Figure 20:
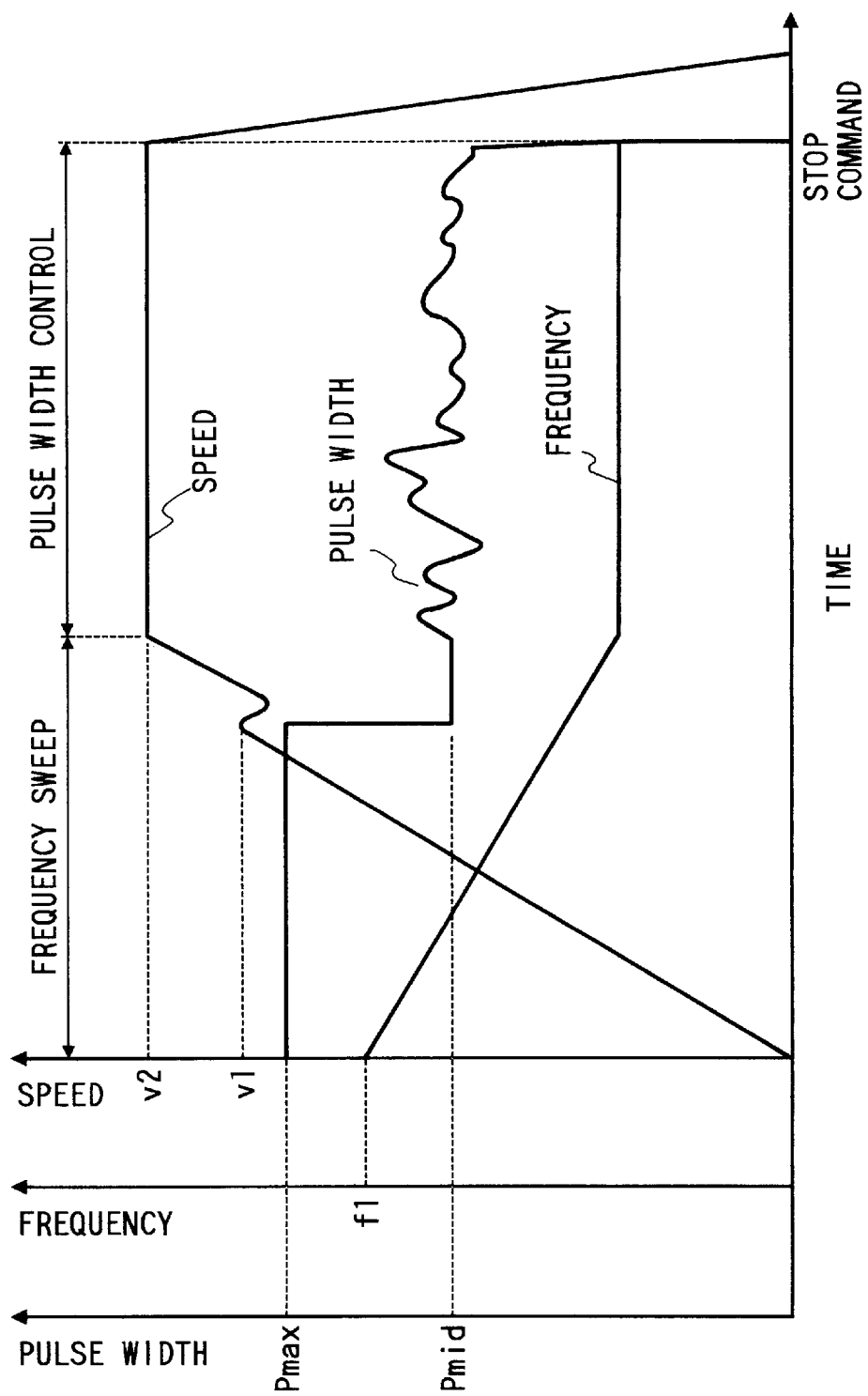
FIG. 20 is a graph showing the characteristics of the speed and manipulated variables in the seventh embodiment.

FIG. 20 shows the profiles of the speed, frequency, and pulse width obtained when the vibration type (wave) motor 3 is controlled according to the seventh embodiment of the present invention. In FIG. 20, f1 is the initial frequency, Pmax is the pulse width at which the maximum value is obtained, and Pmid is the intermediate pulse width. In the seventh embodiment of the present invention, the pulse width upon starting is set at a value at which the maximum output can be obtained from the vibration wave motor, and the pulse width is set at an intermediate value in the vicinity of the target speed. For this reason, even when the frequency is fixed after the driving speed has reached the target speed, the output can be increased by manipulating the pulse width, and stable control is assured.

(Eighth Embodiment)

Figure 21:
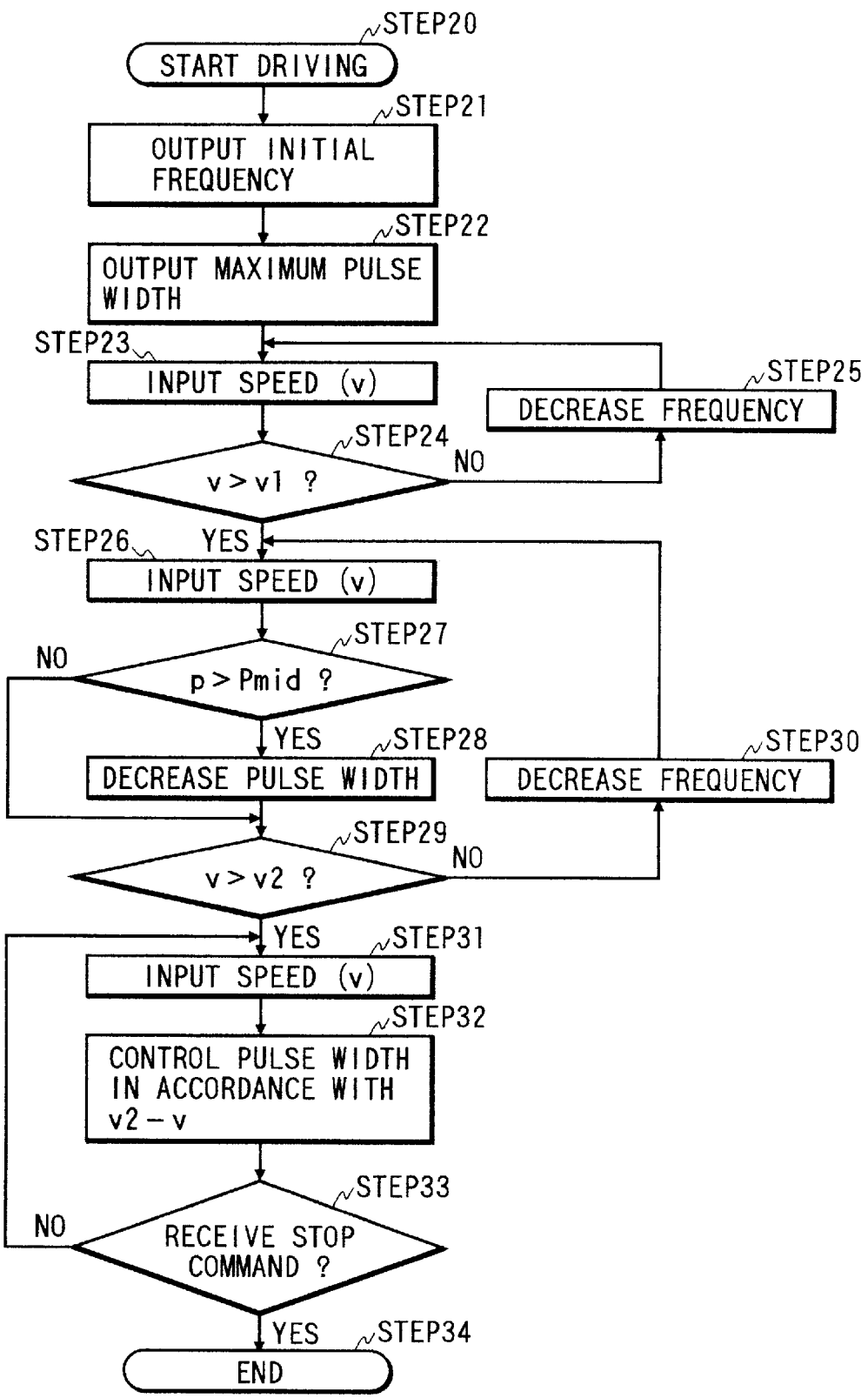
FIG. 21 is a flow chart showing the eighth embodiment.

FIG. 21 is a flow chart showing the eighth embodiment of the present invention. Since the arrangement of a control circuit of the eighth embodiment is the same as that in the seventh embodiment, a detailed description thereof will be omitted. The operation according to the eighth embodiment of the present invention will be described in detail below with reference to FIG. 21.

When a start command of the vibration wave motor is issued in response to an external signal or inside the microcomputer, driving is started in STEP 20.

In STEP 21, a predetermined initial frequency is output to the pulse generator 1.

In STEP 22, a maximum pulse width within the range in which the vibration wave motor 3 or transformer 2 is not destroyed is set in the pulse generator 1 as pulse width data.

In STEP 23, data (v) is input from the speed detector 5.

In STEP 24, it is checked if the input speed (v) is larger than a predetermined value (v1) smaller than the target speed. If NO in STEP 24, the flow advances to STEP 25.

In STEP 25, the driving frequency is decreased. When the acceleration is to be increased, the decrement of the frequency is set to be large; otherwise, the decrement is set to be small. After STEP 25 is executed, the flow returns to STEP 23. The operations from STEP 23 to STEP 25 are executed at predetermined time intervals using timer interrupts or the like produced by the microcomputer, although not shown.

If it is determined in STEP 24 that the driving speed (v) has reached the predetermined speed (v1), the flow advances to STEP 26 to input the speed (v).

In STEP 27, it is checked if the current driving pulse width (p) is larger than a predetermined intermediate value (Pmid). If YES in STEP 27, the flow advances to STEP 28 to decrease the pulse width; otherwise, the flow skips STEP 28 and advances to STEP 29. In the seventh embodiment, the intermediate pulse width value is set at one time in STEP 7 in FIG. 16, while in this embodiment, the pulse width is gradually decreased by a predetermined amount in STEP 28.

In STEP 29, it is checked if the driving speed has reached the target speed. If NO in STEP 29, the frequency is decreased in STEP 30. The operations from STEP 26 to STEP 30 are also executed at predetermined time intervals using timer interrupts or the like produced by the microcomputer, although not shown.

If it is determined in STEP 29 that the driving speed has reached the target speed (V2), the flow advances to STEP 31. In STEP 31, data is input form the speed detector 5.

In STEP 32, the difference (v2−v) between the input speed (v) and the target speed is fed back to manipulate the pulse width, thus controlling the speed.

If it is determined in STEP 33 that a stop command of the vibration wave motor is issued in response to an external signal or inside the microcomputer, the pulse generation is stopped, thus ending the processing.

During the operation from STEP 31 to STEP 33 described above, the frequency is fixed at a value finally set in STEP 30. Also, the operations from STEP 31 to STEP 33 are executed at predetermined time intervals using timer interrupts or the like produced by the microcomputer, although not shown.

Figure 22:
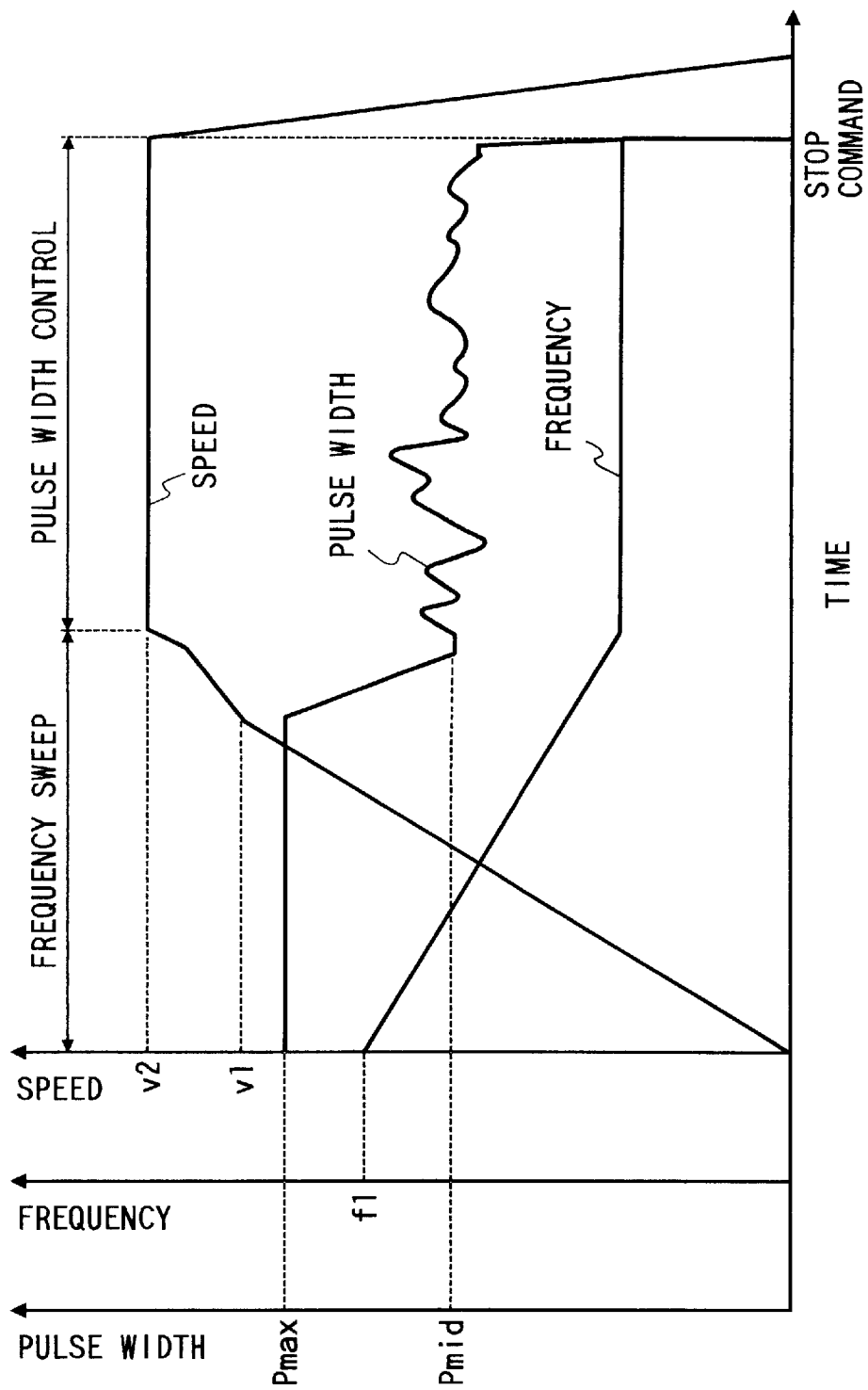
FIG. 22 is a graph showing the characteristics of the speed and manipulated variables in the eighth embodiment.

FIG. 22 shows the profiles of the speed, frequency, and pulse width obtained when the vibration type (wave) motor 3 is controlled according to the eighth embodiment of the present invention. In FIG. 22, f1 is the initial frequency, Pmax is the pulse width at which the maximum value is obtained, and Pmid is the intermediate pulse width. The difference between the eighth and seventh embodiments of the present invention is as follows. That is, in the seventh embodiment, the pulse width is changed to the intermediate pulse width (Pmid) at one time, while in the eighth embodiment, the pulse width is gradually changed to avoid abrupt speed drifts upon changing the pulse width.

(Ninth Embodiment)

Figure 23:
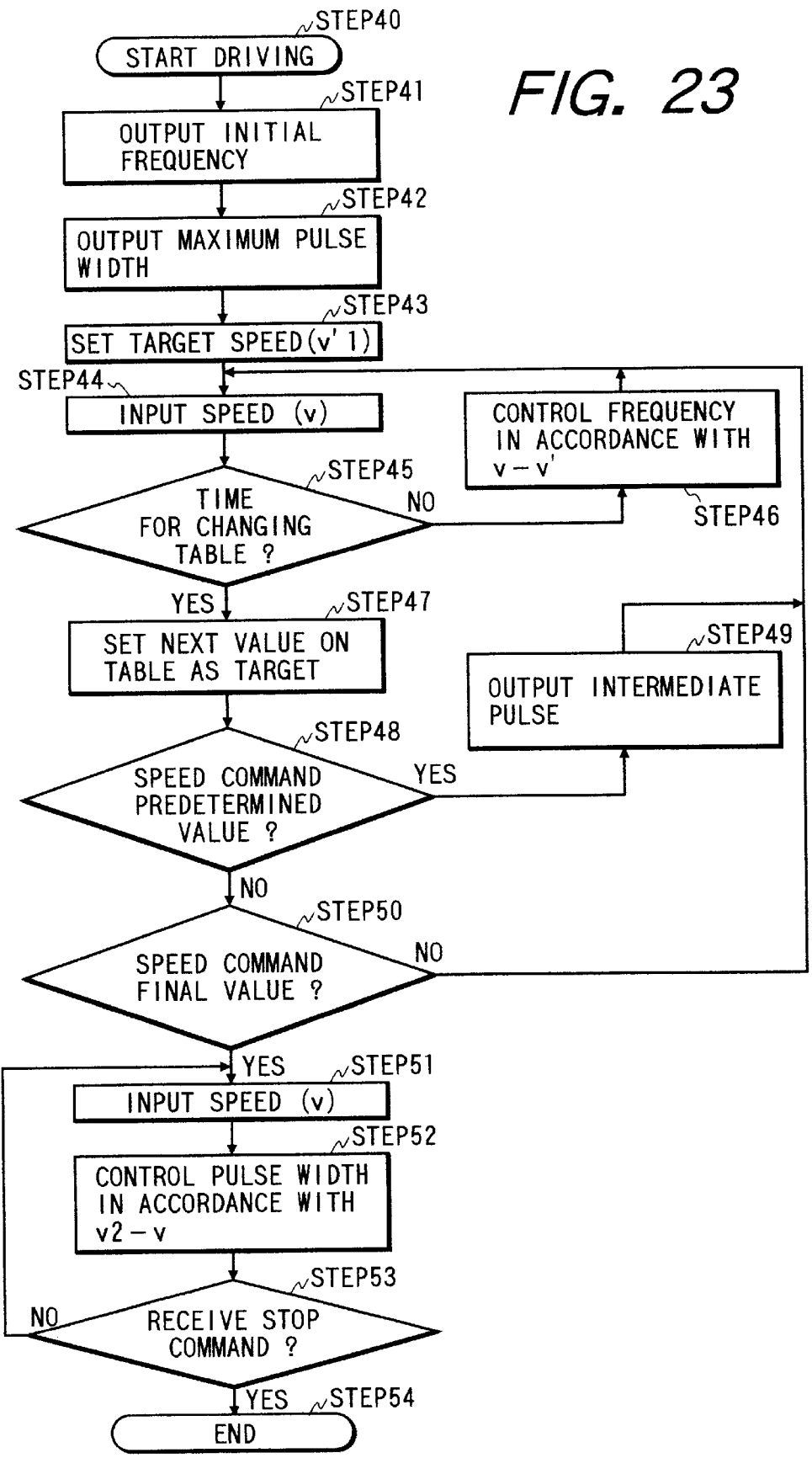
FIG. 23 is a flow chart showing the ninth embodiment.

FIG. 23 is a flow chart showing the ninth embodiment of the present invention. Since the arrangement of a control circuit of the ninth embodiment is the same as that in the seventh embodiment, a detailed description thereof will be omitted. In the seventh and eighth embodiments of the present invention, the microcomputer performs different operations upon acceleration. In this embodiment, the vibration type (wave) motor is controlled to be accelerated on the basis of a predetermined acceleration table (stored in, e.g., the internal memory of the microcomputer 6). The operation according to the ninth embodiment of the present invention will be described in detail below with reference to FIG. 23.

When a start command of the vibration wave motor is issued in response to an external signal or inside the microcomputer, driving is started in STEP 40.

In STEP 41, a predetermined initial frequency is output to the pulse generator 1.

In STEP 42, a maximum pulse width within the range in which the vibration wave motor 3 or transformer 2 is not destroyed is set in the pulse generator 1 as pulse width data.

In STEP 43, a first value (v'1) in the acceleration table is set as the target speed. The acceleration table defines the target speed in correspondence with the lapsed time, as shown in FIG. 24. Upon acceleration, the target speed is changed in the order from the upper speeds in the table, and the vibration type (wave) motor can be started at an arbitrary acceleration. This embodiment uses a table which starts the motor up to 75 [rpm] in 250 [msec] at an equal acceleration.

In STEP 44, data (v) is input from the speed detector 5.

In STEP 45, it is checked if the time of changing the target speed has been reached. In the acceleration table of this embodiment shown in FIG. 24, the target speed is changed at 10-msec intervals. If NO in STEP 45, the flow advances to STEP 46 to control the driving frequency of the vibration type (wave) motor to attain the current target speed (v'n).

In STEP 47, the next data in the acceleration table is set as the target speed.

In STEP 48, it is checked if the current lapsed time is the command time of a predetermined speed. Note that the predetermined speed corresponds to v1 in the seventh and eighth embodiments. If the predetermined speed (v1) is assumed to be 51 [rpm], when v'17 is set as the target value in the table in FIG. 24, i.e., when 170 [msec] have lapsed from the start, YES is determined in STEP 48.

If YES is determined in STEP 48, the flow advances to STEP 49 to output an intermediate pulse width.

If NO is determined in STEP 48, it is checked in STEP 50 if the speed command is a final value, i.e., if the data in the table has reached the last data. If NO in STEP 50, the flow returns to STEP 44; otherwise, the flow advances to STEP 51 to continue speed control by manipulating the pulse width until the stop command is issued, as in the seventh and eighth embodiments.

The difference between the ninth embodiment of the present invention, and the seventh and eighth embodiments of the present invention is as follows. That is, in the seventh and eighth embodiments, acceleration is attained by sweeping the frequency, while in the ninth embodiment, acceleration is attained based on the acceleration table, thus always setting the same rise time and acceleration of the vibration wave motor.

(Tenth Embodiment)

Figure 25:
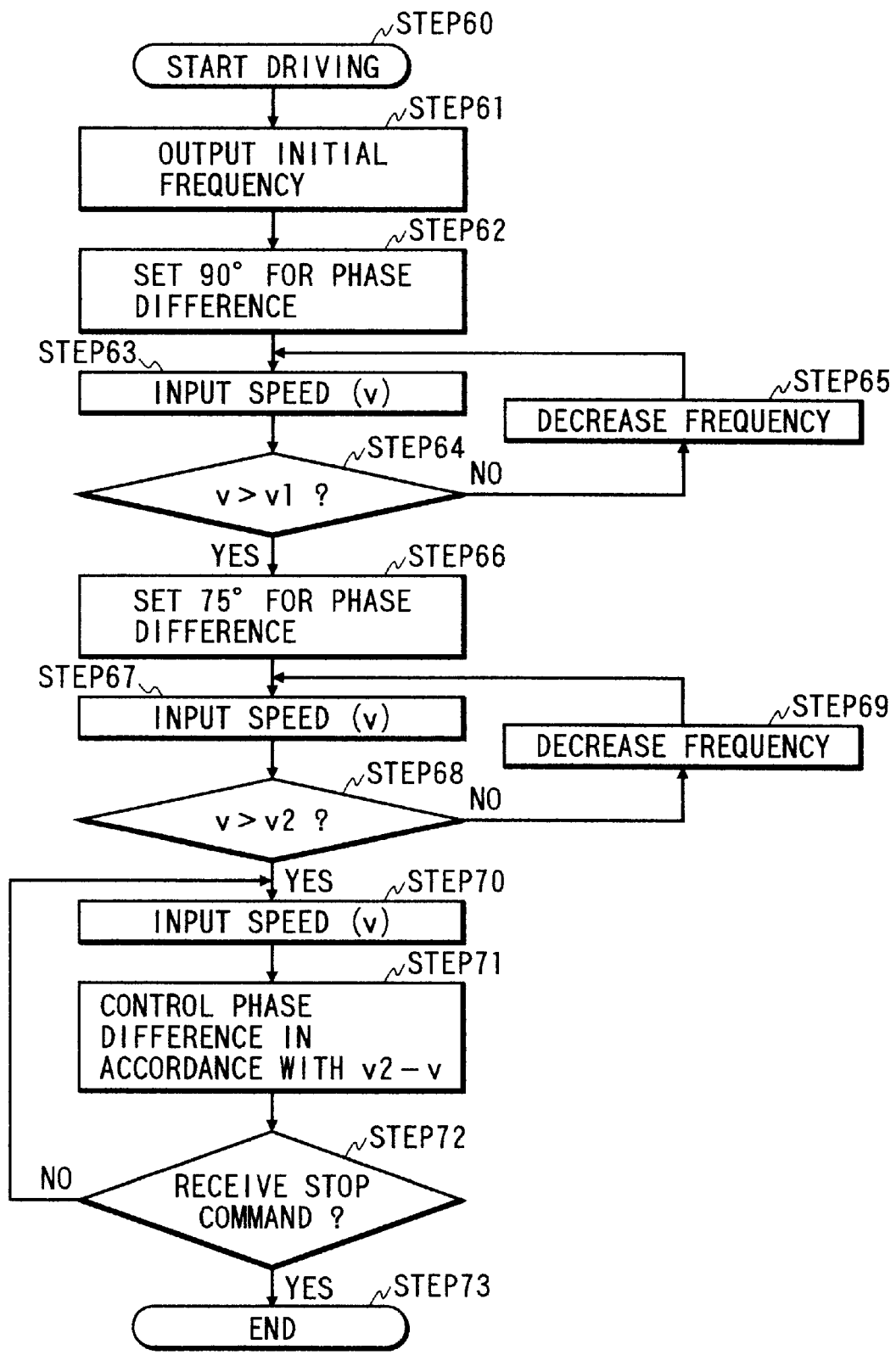
FIG. 25 is a flow chart showing the tenth embodiment.

FIG. 25 shows the tenth embodiment of the present invention. In this embodiment, control attained by manipulating the pulse width in the seventh embodiment is attained by manipulating the phase difference. The vibration type (wave) motor used in this embodiment is driven by applying alternating current voltages as two-phase alternating current signals. When the phase difference between these two phases is 90° and −90°, the output of the vibration wave motor is maximized. The rotation direction when the phase difference is 90° is different from that when it is −90°. In order to obtain the same effect as in the seventh embodiment, 90° as the phase difference that can obtain the maximum output are set in STEP 62, and 75° that can obtain an intermediate output are set in STEP 66.

Since other operations are substantially the same as those in the seventh embodiment except that the speed is controlled by manipulating the phase difference in STEP 71, a detailed description thereof will be omitted.

In the seventh, eighth, ninth, and tenth embodiments described above, the frequency, pulse width, and phase difference are controlled by software of the microcomputer. Alternatively, a logic circuit, a DSP, or the like may be used in place of the microcomputer to obtain the same effect. Also, only one driving direction of the vibration type (wave) motor is described. However, when the motor is driven in the opposite direction, the driving pulses input to the A and B phases of the vibration type (wave) motor 3 may be replaced using, e.g., a switch.

Although not described as a specific embodiment, the pulse width may be gradually changed to the intermediate pulse width across a plurality of steps in the ninth and 10th embodiments, and the acceleration may be performed using the acceleration table in the 10th embodiment.

What is claimed is:

1. A vibration type actuator device in which a frequency signal is applied to an electro-mechanical energy conversion element portion to generate therein vibration that is used as a driving force, said vibration type actuator device comprising:

a frequency control circuit that varies;

an amplitude control circuit that varies an amplitude of the frequency signal; and a driving control circuit that controls operation of said frequency control circuit and said amplitude control circuit to obtain a target control state of said vibration type actuator device, said driving control circuit controlling said frequency control circuit to vary the frequency until a control state of said vibration type actuator device reaches a first control state different from the target control state, and thereafter controlling said amplitude control circuit to vary the amplitude of the frequency signal so as to obtain the target control state.

2. A vibration type actuator device according to claim 1, wherein the target control state is a target speed, and the first control state is a speed higher than the target speed.

3. A vibration type actuator device according to claim 1, further comprising a setting circuit that sets the amplitude of the frequency signal at a maximum amplitude during a time in which said driving control circuit is controlling said frequency control circuit so as to vary the frequency of the frequency signal to obtain the first control state.

4. A vibration type actuator device according to claim 1, further comprising a driving unit that forms a frequency voltage signal in accordance with a frequency of an input pulse and applies the frequency voltage signal to the electro-mechanical energy conversion element portion, and wherein said amplitude control circuit varies the amplitude of the frequency signal by varying a pulse width of the input pulse.

5. A vibration type actuator device in which frequency signals having different phases are applied to first and second electro-mechanical energy conversion element portions to generate therein vibration that is used as a driving force, said vibration type actuator device comprising:

a frequency control circuit that varies a frequency of the frequency signals;

a phase control circuit that varies a phase difference between the frequency signals; and a driving control circuit that controls operation of said frequency control circuit and said phase control circuit to obtain a target control state of said vibration type actuator device, said driving control circuit controlling said frequency control circuit to vary the frequency of the frequency signals until a control state of said vibration type actuator reaches a first control state different from the target control state, and thereafter controlling said phase control circuit to vary the phase difference between the frequency signals so as to obtain the target control state.

6. A vibration type actuator device according to claim 5, wherein the target control state is a target speed, and the first control state is a speed higher than the target speed.

7. A vibration type actuator device according to claim 5, further comprising a setting circuit that sets the phase difference between the frequency signals at 90° during a time in which said driving control circuit is controlling said frequency control circuit so as to vary the frequency of the frequency signals to obtain the first control state.

8. A vibration type actuator device in which a frequency signal is applied to an electro-mechanical energy conversion element portion to generate therein vibration that is used as a driving force, and where the driving force is maintained by varying an amplitude of the frequency signal, said vibration type actuator device comprising:

a frequency control circuit that varies a frequency of the frequency signal;

an amplitude control circuit that varies an amplitude of the frequency signal; and a driving control circuit that controls operation of said frequency control circuit and said amplitude control circuit to change a target control state of said vibration type actuator device during a driving operation, said driving control circuit controlling said frequency control circuit to vary the frequency of the frequency signal such that a control state of said vibration type actuator device proximally approaches a new target control state, and thereafter controlling said amplitude control circuit to change the amplitude of the frequency signal to obtain the target control state and maintain the driving force.

9. A vibration type actuator device according to claim 8, wherein said driving control circuit controls said frequency control circuit so as to vary the frequency of the frequency signal until the control state reaches a predetermined state.

10. A vibration type actuator device according to claim 9, wherein the target control state is a target speed and the predetermined state is a speed higher than the target speed.

11. A vibration type actuator device according to claim 8, wherein before said driving control circuit controls said frequency control circuit so as to vary the frequency of the frequency signal such that the control state of the vibrating type proximally approaches the target control state, said driving control circuit controls said amplitude control circuit so as to lock the amplitude of the frequency signal at an amplitude.

12. A vibration type actuator device according to claim 8, wherein before said driving control circuit controls said frequency control circuit so as to vary the frequency of the frequency signal such that the control state of said vibration type actuator device proximally approaches the target control state, said driving control circuit controls said amplitude control circuit so as to lock the amplitude of the frequency signal at a predetermined amplitude.

13. A vibration type actuator device according to claim 12, wherein the predetermined amplitude is a maximum amplitude.

14. A vibration type actuator device in which a frequency signal is applied to an electro-mechanical energy conversion element portion to generate therein vibration that is used as a driving force, and where the driving force is maintained by varying an amplitude of the frequency signal, said vibration type actuator device comprising:

a frequency control circuit that varies a frequency of the frequency signal;

an amplitude control circuit that varies an amplitude of the frequency signal; and a driving control circuit that controls operation of said frequency control circuit and said amplitude control circuit to change a target control state of said vibration type actuator device during a driving operation, said driving control circuit controlling said frequency control circuit to vary the frequency of the frequency signal such that a control state of said vibration type actuator device proximally approaches a new target control state and simultaneously controlling said amplitude control circuit so as to gradually change the amplitude of the frequency signal to a predetermined amplitude, and thereafter controlling said amplitude control circuit so as to vary the amplitude of the frequency signal to obtain the target control state and maintain the driving force.

15. A vibration type actuator device in which frequency signals having different phases are applied to first and second electro-mechanical energy conversion element portions to generate therein vibration that is used as a driving force, and where the driving force of the vibration type actuator device is controlled by varying a phase difference between the frequency signals, said vibration type actuator device comprising:

a frequency control circuit that varies a frequency of the frequency signals;

a phase control circuit that varies a phase difference between the frequency signals; and a driving control circuit that controls operation of said frequency control circuit and said phase control circuit to change a target control state of said vibration type actuator device during a driving operation, said driving control circuit controlling said frequency control circuit so as to vary the frequency of the frequency signals so as to obtain a new target control state, and thereafter controlling the phase control circuit so as to vary the phase difference between the frequency signals so as to maintain the driving force.

16. A vibration type actuator device according to claim 15, wherein said driving control circuit controls said frequency control circuit so as to vary the frequency of the frequency signals until a driving state of said vibration type actuator device reaches a predetermined state.

17. A vibration type actuator device according to claim 16, wherein the driving state is a driving speed, and the predetermined state is a driving speed higher than a target driving speed.

18. A vibration type actuator device according to claim 15, wherein before said driving control circuit controls said frequency control circuit so as to vary the frequency of the frequency signal so as to obtain a new target control state, said driving control circuit controls said phase control circuit so as to lock the phase difference between the frequency signals at a phase difference.

19. A vibration type actuator device according to claim 15, wherein before said driving control circuit controls said frequency control circuit so as to vary the frequency of the frequency signals so as to obtain a new target control state, said driving control circuit controls said phase control circuit so as to lock the phase difference between the frequency signals at a predetermined phase difference.

20. A vibration type actuator device according to claim 19, wherein the predetermined phase difference is 90°.

21. A vibration type actuator device in which a frequency signal is applied to an electro-mechanical energy conversion element portion to generate therein vibration that is used as a driving force, said vibration type actuator device comprising:

a frequency control circuit that varies a frequency of the frequency signal;

an amplitude control circuit that varies an amplitude of the frequency signal; and a driving control circuit that controls operation of said frequency control circuit and said amplitude control circuit to obtain a target control state of said vibration type actuator device, said driving control circuit controlling said frequency control circuit so as to vary the frequency of the frequency signal until a predetermined control state of said actuator device is obtained, and thereafter controlling the frequency control circuit so as to lock the frequency of the frequency signal and controlling said amplitude control circuit to change the amplitude of the frequency signal to obtain the target control state, wherein during a time when said driving control circuit controls the frequency control circuit so as to vary the frequency until the predetermined control state of said vibration type actuator device is obtained, said driving control circuit also controls said amplitude control circuit so as to change the amplitude of the frequency signal at a predetermined timing after said frequency control circuit starts to vary the frequency of the frequency signal and before said frequency control circuit locks the frequency of the frequency signal.

22. A vibration type actuator device according to claim 21, wherein when said amplitude control circuit changes the amplitude of the frequency signal at the predetermined timing, said amplitude control circuit sets the amplitude of the frequency signal at a predetermined amplitude between a maximum amplitude and a minimum amplitude.

23. A device according to claim 22, wherein at a time when said frequency control circuit begins to vary the frequency of the frequency signal so as to change the control state of said vibration type actuator device to obtain the predetermined control state, said driving control circuit controls said amplitude control circuit so as to set the amplitude of the frequency signal at an amplitude larger than the predetermined amplitude.

24. A vibration type actuator device according to claim 21, wherein the predetermined control state is a target control state.

25. A vibration type actuator device according to claim 24, wherein the control state is a speed control state.

26. A vibration type actuator device according to claim 21, wherein when said amplitude control circuit changes the amplitude of the frequency signal at the predetermined timing, said amplitude control circuit gradually changes the amplitude of the frequency signal to the predetermined amplitude.

27. A vibration type actuator device according to claim 26, wherein said driving control circuit controls said amplitude control circuit so as to set the amplitude of the frequency signal at an amplitude larger than the predetermined amplitude at a time when said frequency control circuit starts to vary the frequency of the frequency signal to obtain the predetermined control state.

28. A vibration type actuator device according to claim 21, wherein said frequency control circuit varies the frequency of the frequency signal on the basis of control data stored in a table and having a lapsed time as a factor.

29. A vibration type actuator device in which frequency signals having different phases are applied to first and second electro-mechanical energy conversion element portions to generate therein vibration that is used as a driving force, said vibration type actuator device comprising:

a frequency control circuit that varies a frequency of the frequency signals;

a phase difference control circuit that varies a phase difference between the frequency signals; and a driving control circuit that controls operation of said frequency control circuit and said phase difference control circuit to obtain a target control state of said vibration type actuator device, said driving control circuit controlling said frequency control circuit so as to vary the frequency of the frequency signals until a control state of said vibration type actuator device reaches a predetermined control state, and thereafter controlling operation of the frequency control circuit to lock the frequency of the frequency signals and controlling operation of said phase difference control circuit to vary the phase difference between the frequency signals, and wherein at a predetermined timing after said frequency control circuit starts to vary the frequency of the frequency signals and before said frequency control circuit locks the frequency of the frequency signals said driving control circuit controls said phase difference control circuit so as to change the phase difference between the frequency signals.

30. A vibration type actuator device according to claim 29, wherein at the predetermined timing, said phase difference control circuit sets the phase difference between the frequency signals at a predetermined phase difference in a range of 0° to 90°.

31. A vibration type actuator device according to claim 30, wherein at a time when said frequency control circuit begins to vary the frequency of the frequency signals so as to obtain the predetermined control state, said driving control circuit controls said phase difference control circuit so as to set the phase difference between the frequency signals at 90°.

32. A vibration type actuator device according to claim 29, wherein the predetermined control state is a target control state.

33. A vibration type actuator device according to claim 32, wherein the control state is a speed control state.

* * * * *

UNITED STATES PATENT AND TRADEMARK OFFICE
CERTIFICATE OF CORRECTION

PATENT NO. : 6,054,795
DATED : April 25, 2000
INVENTOR(S) : Yamamoto et al.

It is certified that error appears in the above-identified patent and that said Letters Patent is hereby corrected as shown below:

Delete columns 1-22 and substitute therefor the specification consisting of columns 1-22, as shown on the attached pages.

Signed and Sealed this

Seventeenth Day of September, 2002

Attest:

Attesting Officer

JAMES E. ROGAN
*Director of the United States Patent and Trademark Office*

DRIVING APPARATUS FOR VIBRATION TYPE ACTUATOR DEVICE

BACKGROUND OF THE INVENTION

1. Field of the Invention

The present invention relates to a control apparatus for a vibration type driving device which drives a vibration member to produce vibrations, and outputs a driving force by utilizing the vibration energy.

2. Related Background Art

Conventionally, a driving circuit for a vibration wave driving device such as a vibration wave motor or the like is constituted by an analog circuit such as a VCO (voltage-controlled oscillator), a phase shifter, and the like. However, the driving circuit is preferably constituted by a digital circuit to attain a size reduction and a cost reduction of the driving circuit. In an example of the driving circuit realized by a digital circuit, the leading and trailing edge timings of driving pulses as two-phase driving signals for driving a two-phase vibration type (vibration wave) motor are generated based on high-frequency reference clocks, and the switching timing of a switching element on the primary side of a transformer as a booster means is determined using these reference clocks.

When the driving signals are generated by the above-mentioned arrangement, the resolution of the oscillation frequency is limited by the clock frequency. When the speed of the vibration wave motor is to be manipulated based on the frequency alone, smooth speed control cannot be attained. For this reason, the speed must be controlled by manipulating both the frequency and the pulse width of the switching element on the primary side of the transformer.

In order to control both the frequency and pulse width, in Japanese Laid-Open Patent Application No. 64-85587, the speed is controlled by sweeping the frequency from higher to lower frequencies (since the frequency region higher than a resonance frequency in a waveform having the resonance frequency as a peak is used as the control region, the rotating speed increases as the frequency becomes lower in this control region), fixing the frequency when the speed has reached a predetermined speed, and then manipulating the driving voltage or pulse width. The speed at which the frequency is fixed substantially matches the speed when the driving voltage is controlled.

However, in the above-mentioned prior art, when the pulse width upon sweeping the frequency is set at a maximum width upon driving, since the speed at which the frequency is fixed substantially matches the target speed, if some environmental factor such as the load, temperature, or the like changes after the frequency is fixed, the motor can no longer be rotated at the target speed at the fixed frequency.

In order to avoid the above-mentioned problem, the frequency may be swept by setting the pulse width at a value smaller than that which corresponds to the maximum speed. However, since the motor output cannot be maximized upon starting, the rise time is long.

Furthermore, when the target speed is changed to a value that exceeds the variable range of the speed by means of the pulse width (amplitude) during driving by the above-mentioned method, normal driving may be disturbed.

For example, when the target value is changed to a speed which is larger than the upper limit of the variable range of the speed by means of the pulse width (amplitude), the driving speed cannot be raised to the target speed. On the other hand, when the target value is changed to a speed smaller than the lower limit of the variable range of the speed by means of the pulse width (amplitude), the vibration wave driving device enters a dead zone with respect to voltage, and stops.

Furthermore, when the pulse width (amplitude) alone is controlled, the variable range of the speed is narrow, and the target speed cannot be largely changed.

SUMMARY OF THE INVENTION

One aspect of the application is to provide a vibration type actuator device which can solve the above-mentioned problems by performing driving control in such a manner that the frequency of a frequency signal to be applied to an electro-mechanical energy conversion element is shifted until a speed shifted by a predetermined amount from a target speed is reached, and thereafter, the amplitude or phase is changed to attain the target speed.

One aspect of the application is to provide a vibration type actuator device which can solve the above-mentioned problems by performing driving control in such a manner that when a new target speed is set during the control for attaining a target speed by changing the amplitude or phase of a frequency signal, the new target speed is attained by changing the frequency, and thereafter, changing the amplitude or phase.

One aspect of the application is to provide a vibration type actuator device which can solve the above-mentioned problems by performing driving control in such a manner that upon executing the speed control to a target speed, the frequency is changed initially, the amplitude or phase is controlled after the frequency is locked, and the amplitude or phase is changed to a predetermined amplitude or phase while the frequency is being changed.

Other objects of the present invention will become apparent from the following description of the embodiments taken in conjunction with the accompanying drawings.

BRIEF DESCRIPTION OF THE DRAWINGS

Figure 7:
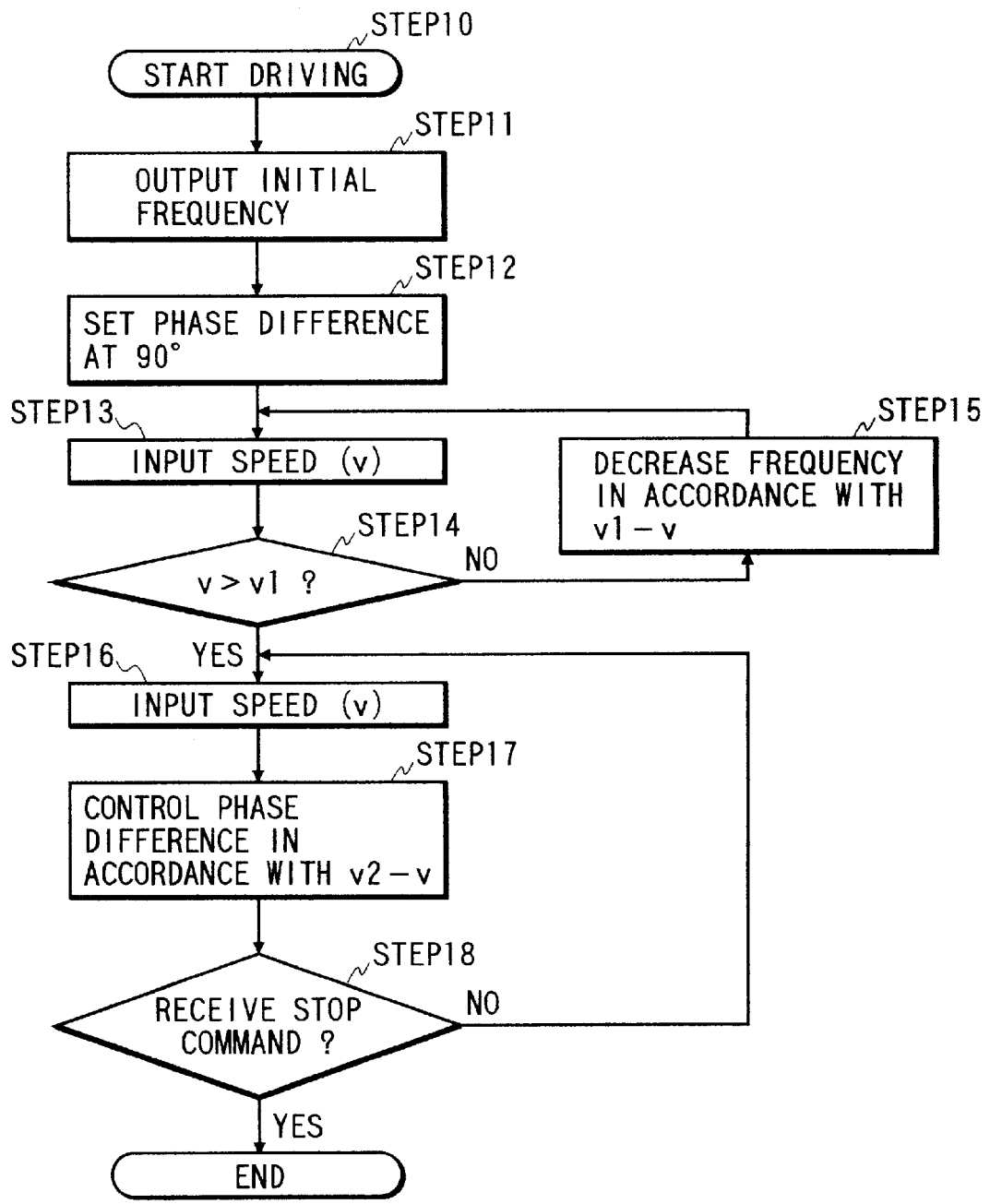
FIG. 7 is a flow chart showing the control operation according to the second embodiment of the present invention.

FIG. 1 is a flow chart showing the control operation according to the first embodiment of the present invention;

FIG. 2 is a block diagram showing the control circuit arrangement for a vibration type driving device according to the present invention;

FIG. 3 is a circuit diagram of a pulse generator shown in FIG. 2;

FIG. 4 is a timing chart showing the individual signals in the pulse generator shown in FIG. 2;

FIG. 5 is a circuit diagram of a transformer shown in FIG. 2;

FIG. 6 is a graph showing the relationship between the speed and time of the driving device controlled in accordance with the flow chart of FIG. 1;

FIG. 7 is a flow chart showing the control operation according to the second embodiment of the present invention;

FIG. 8 is a flow chart showing the control operation according to the third embodiment of the present invention;

FIG. 9 is a flow chart showing the control operation according to the fourth embodiment of the present invention;

FIG. 10 is a graph for explaining the characteristics of a vibration wave motor;

FIG. 11 is a flow chart showing the control operation according to the fifth embodiment of the present invention;

FIG. 12 is a perspective view showing a printer that uses a control circuit according to the sixth embodiment of the present invention;

FIG. 13 shows a document printed by the printer;

FIG. 14 is a chart showing the driving pattern of the carriage of the printer;

FIG. 15 is a chart showing the paper feed pattern of the printer;

FIG. 16 is a flow chart showing the seventh embodiment of the present invention;

FIG. 17 is a block diagram showing a controller used in the seventh embodiment;

FIG. 18 is a block diagram showing the internal circuit of a pulse generator shown in FIG. 17;

FIG. 19 is a timing chart showing the operation of the pulse generator shown in FIG. 17;

FIG. 20 is a graph showing the characteristics of the speed and manipulated variables in the seventh embodiment;

FIG. 21 is a flow chart showing the eighth embodiment;

FIG. 22 is a graph showing the characteristics of the speed and manipulated variables in the eighth embodiment;

FIG. 23 is a flow chart showing the ninth embodiment;

FIG. 24 shows a speed table in the ninth embodiment; and

FIG. 25 is a flow chart showing the tenth embodiment.

DESCRIPTION OF THE PREFERRED EMBODIMENT

(First Embodiment)

FIG. 2 is a block diagram showing a control circuit for the first embodiment of a driving control apparatus of a vibration type driving device according to the present invention.

Referring to FIG. 2, a pulse generator 1 outputs driving pulses for two phases, i.e., A and B phases in correspondence with input frequency data, pulse width data, and phase difference data. FIG. 3 is a circuit diagram showing the internal arrangement of the pulse generator 1. A clock generator 10 generates reference timings of this circuit. A down counter 7 loads data consisting of a plurality of bits, which is input to its DATA terminal, when the input to its LOAD terminal changes to high level. When the data of the down counter becomes 0, the counter outputs a high-level signal from its CO terminal. FIG. 4 is a timing chart showing the states of the individual signals in the circuit shown in FIG. 3. Since the CO terminal of the down counter 7 is connected to its LOAD terminal, the output from the down counter 7 changes to high level for a one-clock period when the count value becomes zero to have frequency data as one cycle, as indicated by a in FIG. 4.

A down counter 8 has a function similar to that of the down counter 7. Since the CO output of the down counter 7 is connected to the LOAD input of the down counter 8, the down counter 8 loads pulse width data for each cycle of the driving pulses, and the CO output of the down counter 8 changes to high level after a time corresponding to the pulse width data lapses, as indicated by b in FIG. 4.

The Q output of an RS flip-flop 9 goes high when its SET input goes high, and goes low when its RESET input goes high. Since the CO output of the down counter 7 is connected to the SET input of the RS flip-flop 9 and the CO output of the down counter 8 is connected to the RESET input thereof, the Q output generates pulses which have the frequency data as one cycle, and change to high level for a time corresponding to the pulse width data. Such pulses serve as A phase outputs.

A down counter 11 determines the phase difference. Since the CO output of the down counter 7 is connected to the LOAD input of the down counter 11, the CO output of the down counter 11 changes to high level with a delay corresponding to the phase difference data after the down counter 7. Since the ideal time phase difference between two phases (A and B phases) to be applied to a vibration wave motor is 90°, the phase difference data is set at a value ¼ the frequency data. In this case, the CO output of the down counter 11 changes, as indicated by d in FIG. 4. As in the A phase, the CO output of a down counter 12 similarly changes, as indicated by e in FIG. 4, and the Q output of an RS flip-flop 13 changes, as indicated by f in FIG. 4.

As a consequence, the pulse generator 1 outputs two-phase pulses, which have the frequency data as one cycle, a pulse width corresponding to the pulse width data, and a phase difference of 90° therebetween.

Referring back to FIG. 2, a booster circuit 2 uses a transformer, an LC resonance circuit, or the like. FIG. 5 shows an example of the booster circuit that uses a transformer.

A vibration wave motor 3 has a stator and a rotor which is in press-contact with the stator. The stator has a structure in which a piezoelectric element (multilayered piezoelectric element) as an electro-mechanical energy conversion element is joined to the side surface of a vibration member, or a structure in which a piezoelectric element (multilayered piezoelectric element) is clamped and fixed between vibration members. As the driving signals, alternating current signals having a time phase difference of 90° therebetween are applied to the two-phase electrodes of the piezoelectric element (multilayered piezoelectric element) of the stator at a frequency near the resonance frequency of a system (the vibration system of the stator or vibration member), traveling waves are produced in the vibration member, thereby rotating the rotor which is in contact with the vibration member.

An encoder 4 is attached to the output shaft of the vibration wave motor 3, and outputs pulses corresponding to the rotation angle by optically or magnetically detecting the angle. A speed detector 5 measures and outputs the frequency of pulses output from the encoder 4. A microcomputer 6 determines various data for the pulse generator 1 on the basis of data obtained from the speed detector 5.

FIG. 1 is a flow chart showing the control operation of the microcomputer 6.

When a start command of the vibration wave motor is issued in response to an external signal or inside the microcomputer, driving is started in STEP 1.

In STEP 2, a predetermined initial frequency is output to the pulse generator 1. Note that the initial frequency selected in this case assumes a value at which a frequency higher than the resonance frequency of the vibration type (wave) motor 3 is set even when the vibration wave motor 3 suffers individual differences or the temperature, load, or the like has changed. This is because the frequency-speed characteristics of the vibration type (wave) motor have gradients in opposite directions to have the resonance frequency as a boundary, and since the gradient becomes extremely steep at frequencies lower than the resonance frequency, control cannot be made stably. In the frequency region higher than the resonance frequency, the driving speed increases as the driving frequency becomes lower; the driving speed decreases as the driving frequency becomes higher.

In STEP 3, a maximum pulse width within the range in which the vibration wave motor 3 or transformer 2 is not destroyed is set in the pulse generator 1 as pulse width data. This is to shorten the start time since the pulse width is selected to allow the vibration wave motor 3 to generate a maximum torque upon starting.

However, when an excessively large pulse width is set, the circuit element such as a switching element in the transformer 2 and the vibration wave motor may be destroyed. For this reason, the pulse width must be set in consideration of such point.

Although not described in the flow chart, the phase difference data to be output to the pulse generator 1 is set so that two-phase pulses output from the pulse generator 1 have a phase difference of 90°, i.e., a value ¼ of the frequency data is always output.

In STEP 4, data (v) is input from the speed detector 5.

In STEP 5, it is checked if the input speed (v) is larger than a value (v1) set in advance. If NO in STEP 5, the flow advances to STEP 6. Note that v1 is set at a value larger than a final target speed (v2).

In STEP 6, the driving frequency is decreased in accordance with the difference between the input speed (v) and the set value (v1). Since the frequency data of the pulse generator 1 defines the value of the cycle of the driving signal, decreasing the frequency means increasing the frequency data. The processing for changing the frequency data may be attained by adding a value obtained by multiplying v1−v by a certain constant, adding a value determined using a table set in correspondence with the value v1−v, or adding a constant value independently of v1−v. After STEP 6 is executed, the flow returns to STEP 4. The operations from STEP 4 to STEP 6 are executed at predetermined time intervals using timer interrupts or the like produced by the microcomputer.

If YES is determined in STEP 5, the flow advances to STEP 7. The frequency is fixed in this process, and is not changed from then on.

In STEP 7, speed data (v) is input as in STEP 4.

In STEP 8, the pulse width is controlled based on the difference between the input speed (v) and the target speed (v2). The processing for controlling the pulse width may be attained by a multiplication of v2−v and a constant or using a table. As described above, the target speed (v2) is set to be lower than the speed (v1) used as a reference upon fixing the frequency. As the detailed control in STEP 8, when v2−v is negative, the pulse width is decreased; when v2−v is positive, the pulse width is increased.

In STEP 9, it is checked if an external circuit or the microcomputer has issued a stop command to the vibration wave motor 3. If NO in STEP 9, the flow returns to STEP 7 to continue the speed control; otherwise, driving of the vibration type (wave) motor is stopped.

FIG. 6 shows the speed profile obtained when the vibration type (wave) motor 3 is controlled according to the first embodiment of the present invention. In the first embodiment of the present invention, since the pulse width upon starting is set at a value with which the maximum output can be obtained from the vibration type (wave) motor, and the frequency is fixed at a speed higher than the target speed, when the speed is controlled by manipulating the pulse width in the steady state, the pulse width does not reach its maximum value, i.e., the control is made while providing a sufficient margin to the pulse width. With this control, even when the frequency resolution is low like in a case wherein output pulses are generated by, e.g., a digital circuit, the frequency need not be changed in the steady state, thus preventing increases in speed drift. That is, both a short start time and speed stability in the steady state can be realized.

In this embodiment, only one driving direction of the vibration type (wave) motor is described. However, when the motor is driven in the opposite direction, the driving pulses input to the A and B phases of the vibration type (wave) motor 3 may be replaced using, e.g., a switch.

In this embodiment, the frequency and pulse width are controlled by software of the microcomputer. Alternatively, a logic circuit, a DSP, or the like may be used in place of the microcomputer to obtain the same effect.

(Second Embodiment)

The second embodiment of the present invention will be described below.

Since the circuit arrangement of a control apparatus for a vibration type driving device in the second embodiment is the same as that in the first embodiment shown in FIG. 2, a detailed description thereof will be omitted. The difference between the first and second embodiments lies in the processing in the microcomputer 6. In the first embodiment, the speed control upon steady driving is attained by manipulating the pulse width. However, in the second embodiment, the speed control upon steady driving is attained by manipulating the phase difference of the driving signals. The operation of the control apparatus for the vibration type driving device according to the second embodiment of the present invention will be described in detail below with reference to the flow chart in FIG. 7.

When a start command of the vibration wave motor is issued in response to an external signal or inside the microcomputer, driving is started in STEP 10.

In STEP 11, a predetermined initial frequency is output to the pulse generator 1. Note that the initial frequency selected in this case assumes a value at which a frequency higher than the resonance frequency of the vibration type (wave) motor 3 is set even when the vibration type (wave) motor 3 suffers individual differences or the temperature, load, or the like has changed, as in the first embodiment.

In STEP 12, 90° as a phase difference at which the vibration type (wave) motor 3 can produce a maximum torque are set in the pulse generator 1 so as to shorten the start time. More specifically, the pulse width data is set at ¼ frequency data. Although not described in the flow chart, the pulse width data to be output to the pulse generator 1 is selected to set a maximum pulse width within the range in which the vibration wave motor is not destroyed.

In STEP 13, data (v) is input from the speed detector 5.

In STEP 14, it is checked if the input speed (v) is larger than a value (v1) set in advance. If NO in STEP 14, the flow advances to STEP 15. Note that v1 is set at a value larger than a final target speed (v2).

In STEP 15, the driving frequency is decreased in accordance with the difference between the input speed (v) and the set value (v1). Since the frequency data of the pulse generator 1 defines the value of the cycle of the driving signal, decreasing the frequency means increasing the frequency data. The processing for changing the frequency data may be attained by adding a value obtained by multiplying v1−v by a certain constant, adding a value determined using a table set in correspondence with the value v1−v, or adding a constant value independently of v1−v. After STEP 15 is executed, the flow returns to STEP 12 to set the phase difference at 90° in correspondence with the changed frequency. The operations from STEP 12 to STEP 15 are executed at predetermined time intervals using timer interrupts or the like produced by the microcomputer.

If YES is determined in STEP 14, the flow advances to STEP 16. The frequency is fixed in this process, and is not changed at a later time.

In STEP 16, speed data (v) is input as in STEP 13.

In STEP 17, the phase difference is controlled based on the difference between the input speed (v) and the target speed (v2). The processing for controlling the phase difference may be attained by multiplication of v2−v and a constant or using a table. As described above, the target speed (v2) is set to be lower than the speed (v1) used as a reference upon fixing the frequency. The relationship between the phase difference and speed has characteristics in which the speed assumes a peak value when the phase difference is 90°. In this case, since changes in speed have equal gradients on both sides larger and smaller than 90°, either side may be used to have 90° as a limit.

In STEP 18, it is checked if an external circuit or the microcomputer has issued a stop command to the vibration wave motor 3. If NO in STEP 18, the flow returns to STEP 16 to continue the speed control; otherwise, driving of the vibration type (wave) motor is stopped.

When the vibration wave motor 3 is controlled according to the second embodiment of the present invention, the speed profile shown in FIG. 6 is obtained as in the first embodiment.

In the second embodiment of the present invention, since the phase difference between the two-phase driving signals upon starting is set at a value with which the maximum output can be obtained from the vibration wave motor, and the driving frequency upon starting is fixed at a speed higher than the target speed, when the speed is controlled by manipulating the phase difference in the steady state, the phase difference does not become 90°, i.e., the control can be made while providing a sufficient margin to the phase difference. With this control, even when the frequency resolution is low like in a case wherein output pulses are generated by, e.g., a digital circuit, the frequency need not be changed in the steady state, thus preventing increases in speed drift. That is, both a short start time and speed stability in the steady state can be realized.

In this embodiment, only one driving direction of the vibration type (wave) motor is described. However, when the motor is driven in the opposite direction, the driving pulses input to the A and B phases of the vibration type (wave) motor 3 may be replaced using, e.g., a switch.

In this embodiment, the frequency and pulse width are controlled by software of the microcomputer. Alternatively, a logic circuit, a DSP, or the like may be used in place of the microcomputer to obtain the same effect.

(Third Embodiment)

The third embodiment of the present invention will be described below with reference to FIG. 8. Since the arrangement of a control apparatus of this embodiment is the same as that of the first embodiment, a detailed description thereof will be omitted. Note that FIG. 8 shows the flow executed when the target speed is changed during the speed control of the motor.

More specifically, when the target speed has been changed during driving in which the pulse width (amplitude) is controlled by a conventional method such as a method of fixing the frequency when the speed of the vibration type (wave) motor 3 has reached a required speed upon sweeping the frequency, and then changing the pulse width, a method of determining the frequency on the basis of the predetermined relationship between the frequency and speed of the vibration type (wave) motor 3, and then changing the pulse width, and the like, the control enters the speed control data determination routine in STEP 1.

In STEP 2, the pulse width of the driving pulses (i.e., the amplitude of alternating current wave driving signals) is fixed at the pulse width at that time, i.e., at the time of changing the target speed.

In STEP 3, it is checked whether the target speed is changed to accelerate or decelerate the motor. If the target speed is changed to accelerate the motor, the flow advances to STEP 4 to acquire speed information from the speed detector 5, and the flow then advances to STEP 5.

In STEP 5, it is checked if the detected speed acquired in STEP 4 is faster than the new target speed. If the detected speed is slower than the new target speed, the flow advances to STEP 6 to decrease the frequency of the driving pulses to make the driving frequency approach the resonance frequency, thereby increasing the driving speed of the vibration type (wave) motor 3.

Note that the frequency may be decreased by either a method of decreasing the frequency based on the difference between the detected speed and a predetermined speed, or a method of subtracting a constant value independently of the detected speed.

If it is determined in STEP 5 that the new target speed is faster than the detected speed, the flow advances to STEP 7.

On the other hand, if it is determined in STEP 3 that the target speed is changed to decelerate the motor, the flow advances to STEP 9 to acquire speed information from the speed detector 5, and the flow then advances to STEP 10.

In STEP 10, it is checked if the detected speed acquired in STEP 9 is slower than the new target speed. If the detected speed is faster than the new target speed, the flow advances to STEP 11 to increase the frequency to make the driving frequency separate from the resonance frequency, thereby decreasing the driving speed of the vibration type (wave) motor 3.

Note that the frequency may be increased by either a method of increasing the frequency based on the difference between the detected speed and a predetermined speed, or a method of adding a constant value independently of the detected speed.

If it is determined in STEP 10 that the detected speed is slower than the new target speed, the flow advances to STEP 7.

In STEP 7, the frequency of the driving pulses is fixed. This frequency assumes an optimal value with respect to the new target speed in STEPs 4, 5, and 6 or STEPs 9, 10, and 11.

In STEP 8, speed control (pulse width control) is made by manipulating the pulse width of the driving pulses while the frequency is fixed. More specifically, although not described in the flow chart, the processing for fetching speed information and changing the pulse width in accordance with the difference between the fetched speed and the target speed, or the like is executed.

Thereafter, the pulse width control continues until the target speed is changed again. When the target speed has been changed, the flow returns to STEP 1 to change the frequency.

With this speed control, when the target speed has been changed during driving of the vibration type (wave) motor 3, the driving frequency is changed to an optimal value to make the speed quickly approach the target speed. After the frequency is determined, the speed can reliably and stably be made to substantially attain the target speed by manipulating the pulse width (amplitude).

(Fourth Embodiment)

FIG. 9 is a flow chart showing the speed control operation of a control circuit according to the fourth embodiment of the present invention. In the third embodiment, the pulse width of the driving pulses is fixed at the pulse width (amplitude) at the time of changing the target speed. However, since the characteristics of the vibration type (wave) motor change as the pulse width changes, as shown in FIG. 10, the pulse width upon accelerating or decelerating the motor need be constant to always attain similar acceleration and deceleration. To achieve this, this embodiment improves the control method to always attain constant acceleration and deceleration.

According to the result of an experiment conducted by the present applicant, it is preferable to set the pulse width at a largest possible value upon acceleration and deceleration. As the pulse width upon acceleration is larger, smoother acceleration can be attained, and if the pulse width upon driving the motor at low speed is small, the motor is driven unstably due to the presence of a dead zone with respect to the voltage of the vibration wave motor. Note that the arrangement of the control circuit is the same as that of the first embodiment.

When the target speed has been changed during the pulse width control of the vibration type (wave) motor 3, the control enters the speed control routine in STEP 12.

In STEP 13, the pulse width is set at the maximum value. Note that the maximum value means a pulse width that maximizes the output of the vibration type (wave) motor 3 within the range in which the vibration type (wave) motor 3 and the transformer 2 are not destroyed.

In STEP 14, it is checked whether the target speed is changed to accelerate or decelerate the motor. If the target speed is changed to accelerate the motor, the flow advances to STEP 15 to acquire speed information from the speed detector 5, and the flow then advances to STEP 16.

In STEP 16, it is checked if the speed information acquired in STEP 15 is faster than a predetermined speed. Note that the predetermined speed is set at a proper value larger than the new target speed. The reason why the predetermined speed is set at a value larger than the new target speed is that the speed cannot be increased by manipulating the pulse width after the frequency is fixed since the pulse width upon manipulating the frequency assumes a maximum value. More specifically, upon manipulating the pulse width so that the speed reaches the target speed after the frequency is fixed, the pulse width is decreased to some extent, and when the load acts or an environmental factor such as temperature changes, the pulse width is increased to maintain the target speed.

If it is determined in STEP 16 that the detected speed is slower than the predetermined speed, the flow advances to STEP 17 to decrease the frequency to make it approach the resonance frequency, thereby increasing the speed of the vibration wave motor 3.

Note that the frequency may be decreased by either a method of decreasing the frequency based on the difference between the detected speed and a predetermined speed, or a method of subtracting a constant value independently of the detected speed.

If it is determined in STEP 16 that the detected speed is faster than the predetermined speed, the flow advances to STEP 18.

On the other hand, if it is determined in STEP 14 that the target speed is changed to decelerate the motor, the flow advances to STEP 20 to acquire speed information from the speed detector 5, and the flow then advances to STEP 21.

In STEP 21, it is checked if the detected speed is slower than a predetermined speed. Note that the predetermined speed is set at a value larger than the new target speed for the same reason as in STEP 16.

If the detected speed is faster than the predetermined speed, the flow advances to STEP 22 to decrease the frequency to make it separate from the resonance frequency, thereby decreasing the speed of the vibration type (wave) motor 3.

Note that the frequency may be increased by either a method of increasing the frequency based on the difference between the detected speed and a predetermined speed, or a method of adding a constant value independently of the detected speed.

If it is determined in STEP 21 that the detected speed is slower than the predetermined speed, the flow advances to STEP 18.

In STEP 18, the frequency of the driving pulses is fixed. Thereafter, as in the third embodiment, the pulse width of the driving pulses is manipulated to control the speed to make it substantially match the new target speed. The pulse width control continues until the target speed is changed again. When the target speed has been changed, the flow returns to STEP 12 to change the frequency.

With this control, when the target speed has been changed during driving of the vibration type (wave) motor 3, the driving frequency can be quickly set at an optimal value with similar acceleration/deceleration, and after the frequency is determined, reliable, stable speed control can be realized by manipulating the pulse width.

(Fifth Embodiment)

FIG. 11 is a flow chart showing the speed control operation of a control circuit according to the fifth embodiment of the present invention. In the fourth embodiment, when the target speed has been changed, the pulse width is changed to a maximum value, and thereafter, the frequency is manipulated. However, if the pulse width immediately after the target speed has been changed assumes a small value, if the pulse width is changed to the maximum value, the speed of the vibration wave motor increases abruptly, thus producing noise or applying stress on the load.

This embodiment improves the above embodiment to solve such problem, and allows stable acceleration/deceleration without abruptly changing the speed of the vibration type (wave) motor. Note that the arrangement of the control circuit is the same as that of the first embodiment.

When the target speed has been changed during the pulse width control of the vibration type (wave) motor 3, the control enters the speed control routine in STEP 23.

In STEP 24, it is checked whether the target speed is changed to accelerate or decelerate the motor. If the target speed is changed to accelerate the motor, the flow advances to STEP 25 to acquire speed information (detected speed) from the speed detector 5, and the flow then advances to STEP 26.

In STEP 26, it is checked if the pulse width has a maximum value. If NO in STEP 26, the flow advances to STEP 27 to increase the pulse width. Note that the maximum value means a pulse width that maximizes the output of the vibration type (wave) motor 3 within the range in which the vibration type (wave) motor 3 and the transformer 2 are not destroyed. The increment of the pulse width in STEP 27 is a constant value within the range in which the speed does not change abruptly. The flow advances from STEP 27 to STEP 28.

In STEP 28, it is checked if the detected speed is faster than a predetermined speed that is, in turn, faster than the new target speed. If the detected speed is slower than the predetermined speed, the flow advances to STEP 29 to decrease the frequency to make it approach the resonance frequency. The flow then returns from STEP 29 to STEP 25.

In this manner, the operations from STEP 25 to STEP 29 are repeated until it is determined in STEP 28 that the detected speed is faster than the predetermined speed, and thereafter, the flow advances to STEP 30.

On the other hand, if it is determined in STEP 24 that the target speed is changed to decelerate the motor, the flow advances to STEP 32 to acquire speed information from the speed detector 5, and the flow then advances to STEP 33.

In STEP 33, it is checked if the pulse width has a maximum value. If NO in STEP 33, the flow advances to STEP 34 to increase the pulse width. Note that the increment of the pulse width in STEP 34 is a constant value within the range in which the speed does not change abruptly. The flow then advances from STEP 34 to STEP 35.

In STEP 35, it is checked if the detected speed is slower than a predetermined speed faster than the new target speed. If the detected speed is faster than the predetermined speed, the flow advances to STEP 36 to increase the frequency to make it separate from the resonance frequency. The flow then returns from STEP 36 to STEP 32.

In this manner, the operations from STEP 32 to STEP 36 are repeated until it is determined in STEP 35 that the detected speed is slower than the predetermined speed, and thereafter, the flow advances to STEP 30.

In STEP 30, the frequency is fixed. In STEP 31, the speed is controlled to make it substantially match the target speed by manipulating the pulse width. Thereafter, when the target speed has been changed again, the flow returns to STEP 23 to change the frequency.

With this control, when the target speed has been changed during driving of the vibration type (wave) motor 3, the driving frequency can be quickly set at an optimal value with similar acceleration/deceleration without applying any stress to the load connected to the vibration wave motor 3 or producing any noise. Furthermore, after the frequency is determined, reliable, stable speed control can be realized by manipulating the pulse width.

Note that the third, fourth, and fifth embodiments describe only the method of changing the speed with respect to the frequency and pulse width. However, the actual command to be supplied to the pulse generator 1 is output to decrease the frequency data shown in FIG. 3 when the frequency is to be increased, and phase difference data for the frequency at that time is also output.

In each of the above embodiments, the pulse width of the driving pulses is changed. In place of the pulse width, the phase difference between the two-phase driving signals may be changed to attain speed control, thus attaining the same effects. In this case, the phase difference that allows the vibration wave motor 3 to generate a maximum output is 90° and −90°.

(Sixth Embodiment)

FIG. 12 shows a thermal jet printer that uses a control circuit according to the sixth embodiment of the present invention. In FIG. 12, a sheet feeder 14 serves to pick up a plurality of sheets stacked therein one by one, and to feed the picked-up sheet to a sheet feed system.

A carriage 15 moves an ink head in the main scanning direction. Recording onto a paper sheet is attained by ejecting ink expanded by heat from a large number of nozzles arranged at the end of the ink head.

A platen roller 16 feeds the sheet fed from the sheet feeder 14.

A sheet feed vibration type (wave) motor 17 has an output shaft directly connected to the platen roller 16, and serves as a driving source for feeding the paper sheet.

A rotary encoder 18 is connected to the output shaft of the sheet feed vibration wave motor 17, and detects the rotation angle of the sheet feed vibration wave motor 17.

A linear scale 19 is formed with a plurality of fine density patterns. A photocoupler (not shown) attached to the carriage 15 detects the density patterns to detect the moving amount of the carriage 15.

A carriage driving vibration type (wave) motor 20 drives a belt 23 via a pulley 22 to drive the carriage 15 attached to the belt 23.

A recovery system 21 draws ink by suction to prevent the nozzles of the ink head attached to the carriage 15 from clogging with dried ink.

Some of the documents to be printed by the printer have no characters on the central portion of the paper sheet, as shown in FIG. 13. The carriage 15 must be moved at a predetermined speed during printing since the ejection frequency of the ink head is limited. However, the carriage 15 is preferably moved at higher speed in a non-printing region to shorten the print time. Thus, when a document shown in FIG. 13 is to be printed, the speed of the carriage driving vibration type (wave) motor 20 must be changed during printing.

FIG. 14 shows changes in target speed in correspondence with changes in carriage position in this case. As shown in FIG. 14, the motor is temporarily accelerated at the central portion without any characters of the paper sheet, and is decelerated again to perform printing when the carriage reaches a character portion, thus realizing high-speed printing while maintaining high print quality. When the target speed has been changed during driving (after printing is started) of the carriage driving vibration type (wave) motor 20 in this manner, the motor 20 is controlled by the method described in one of the third to fifth embodiments.

On the other hand, the sheet feed vibration type (wave) motor 17 feeds the paper sheet by one line upon completion of printing for one line by scanning the carriage 15. When it is detected based on the signal from the rotary encoder 18 that the paper sheet has been fed by one line, the sheet feed vibration type (wave) motor 17 stops the paper sheet by setting the applied voltage at zero.

After feeding is stopped, the sheet position is maintained by the holding force of the sheet feed vibration type (wave) motor 17. In the serial printer shown in FIG. 11, the sheet feed quantity precision has a large influence on the print precision. According to an experiment conducted by the present applicant, the precision of the sheet stop position can be improved by lowering the speed of the sheet feed vibration type (wave) motor 17 immediately before feeding is stopped. However, when the sheet is fed at low speed from the beginning to end, the print time becomes long.

In view of this problem, as shown in FIG. 15, the sheet is fed at high speed at the beginning of sheet feeding, and is fed at low speed from a position immediately before the stop position, thus realizing high-speed printing while maintaining high print quality.

When the target speed is changed during driving (after sheet feeding is started) of the sheet feed vibration type (wave) motor 17, the motor 17 is also controlled by the method described in one of the third to fifth embodiments.

(Seventh Embodiment)

FIG. 17 is a block diagram showing a control circuit of the seventh embodiment in which the present invention is applied to a vibration wave motor. The control circuit according to the seventh embodiment of the present invention will be described below with reference to FIG. 17.

Referring to FIG. 17, a pulse generator 1 outputs two-phase pulses for two phases in correspondence with input frequency data and pulse width data. FIG. 18 is a circuit diagram showing the internal arrangement of the pulse generator 1. A clock generator 10 generates reference timings of this circuit. A down counter 7 loads data consisting of a plurality of bits, which is input to its DATA terminal, when the input to its LOAD terminal changes to high level. When the data of the down counter becomes 0, the counter outputs a high-level signal from its CO terminal.

FIG. 19 is a timing chart showing the states of the individual signals in the circuit shown in FIG. 18. Since the CO terminal of the down counter 7 is connected to its LOAD terminal, the output from the down counter 7 changes to high level for a one-clock period when the count value becomes zero to have frequency data as one cycle, as indicated by a in FIG. 19.

A down counter 8 in FIG. 18 has a function similar to that of the down counter 7. Since the CO output of the down counter 7 is connected to the LOAD input of the down counter 8, the down counter 8 loads pulse width data for each cycle of the driving pulses, and the CO output of the down counter 8 changes to high level after a time corresponding to the pulse width data lapses, as indicated by b in FIG. 19.

The Q output of an RS flip-flop 9 in FIG. 18 goes high when its SET input goes high, and goes low when its RESET input goes high. Since the CO output of the down counter 7 is connected to the SET input of the RS flip-flop 9 and the CO output of the down counter 8 is connected to the RESET input thereof, the Q output generates pulses which have the frequency data as one cycle, and change to high level for a time corresponding to the pulse width data, as indicated by c in FIG. 19. Such pulses serve as A phase outputs. The RS flip-flop 9 changes in synchronism with the leading edge of the clock input.

A down counter 11 in FIG. 18 determines the phase difference. Since the CO output of the down counter 7 is connected to the LOAD input of the down counter 11, the CO output of the down counter 11 changes to high level with a delay corresponding to the input data after the down counter 7. Since the ideal time phase difference between two phases (A and B phases) to be applied to a vibration wave motor is 90° or −90°, the phase difference data is set at a value ¼ the frequency data. In this case, the CO output of the down counter 11 changes, as indicated by d in FIG. 19. As in the A phase, the CO output of a down counter 12 similarly changes, as indicated by e in FIG. 19, and the Q output of an RS flip-flop 13 changes, as indicated by f in FIG. 19.

As a consequence, the pulse generator 1 shown in FIG. 17 outputs two-phase pulses, which have the frequency data as one cycle, a pulse width corresponding to the pulse width data, and a phase difference of 90° therebetween.

Referring back to FIG. 17, a booster circuit 2 uses a transformer, an LC resonance circuit, or the like with the arrangement shown in FIG. 5.

A vibration type (wave) motor 3 has a known structure, and generates travelling waves in a stator by applying, to two-phase electrodes, alternating current signals having a time phase difference of 90° therebetween at a frequency near the resonance frequency of the stator, thereby rotating a rotor in press-contact with the stator.

An encoder 4 is attached to the output shaft of the vibration type (wave) motor 3, and outputs pulses corresponding to the rotation angle by optically or magnetically detecting the angle.

A speed detector 5 measures and outputs the frequency of pulses output from the encoder 4.

A microcomputer 6 determines various data for the pulse generator 1 on the basis of data obtained from the speed detector 5.

FIG. 16 is a flow chart showing the control method by the microcomputer 6. The operation according to the seventh embodiment of the present invention will be described in detail below with reference to FIG. 16.

In the following description of FIG. 16, v2 represents the target speed as a steady speed, and v1 represents a predetermined speed as a non-steady speed slower than v2. Note that the steady speed and the non-steady speed, which is not used in practice, are determined depending on the device to be used.

When the start command of the vibration type (wave) motor is issued in response to an external signal or inside the microcomputer, driving is started in STEP 1.

In STEP 2, a predetermined initial frequency is output to the pulse generator 1. Note that the initial frequency selected in this case assumes a value at which a frequency higher than the resonance frequency of the vibration type (wave) motor 3 is set even when the vibration wave motor 3 suffers individual differences or the temperature, load, or the like has changed. This is because the frequency-speed characteristics of the vibration wave motor have gradients in opposite directions to have the resonance frequency as a boundary, and since the gradient becomes extremely steep at frequencies lower than the resonance frequency, control cannot be made stably.

In STEP 3, a maximum pulse width within the range in which the vibration wave motor 3 or transformer 2 is not destroyed is set in the pulse generator 1 as pulse width data. This is to shorten the start time since the pulse width is selected to allow the vibration type (wave) motor 3 to generate a maximum torque upon starting. However, when an excessively large pulse width is set, the circuit element such as a switching element in the transformer 2 and the vibration wave motor may be destroyed. For this reason, the pulse width must be set in consideration of safety of these circuits.

In STEP 4, data (v) is input from the speed detector 5.

In STEP 5, it is checked if the input speed (v) is larger than a predetermined value (v1) smaller than the target speed (v2). If NO in STEP 5, the flow advances to STEP 6.

In STEP 6, the driving frequency is decreased. When the acceleration is to be increased, the decrement of the frequency is set to be large; otherwise, the decrement is set to be small. Since the frequency data of the pulse generator 1 defines the value of the cycle of the driving signal, decreasing the frequency means increasing the frequency data. After STEP 6 is executed, the flow returns to STEP 4. The operations from STEP 4 to STEP 6 are executed at predetermined time intervals using timer interrupts or the like produced by the microcomputer, although not shown.

If it is determined in STEP 5 that the driving speed (v) has reached the predetermined speed (v1), the flow advances to STEP 7. In STEP 7, the pulse width is set at an intermediate value smaller than the maximum value.

In STEP 8 to STEP 10, the frequency is decreased until the driving speed reaches the target speed (v2). The pulse width at this time is the intermediate one set in STEP 7. Although not shown, the operations from STEP 8 to STEP 10 are also executed at predetermined time intervals using timer interrupts or the like produced by the microcomputer.

If it is determined in STEP 9 that the driving speed has reached the target speed (v2), the flow advances to STEP 11. In STEP 11, data is input from the speed detector 5.

In STEP 12, the difference (v2−v) between the input speed (v) and the target speed is fed back to manipulate the pulse width, thus controlling the speed.

If it is determined in STEP 13 that a stop command of the vibration wave motor is issued in response to an external signal or inside the microcomputer, the pulse generation is stopped, thus ending the processing.

During the operation from STEP 11 to STEP 13 described above, the frequency is fixed at a value finally set in STEP 10. Also, the operations from STEP 11 to STEP 13 are executed at predetermined time intervals using timer interrupts or the like produced by the microcomputer, although not shown.

FIG. 20 shows the profiles of the speed, frequency, and pulse width obtained when the vibration type (wave) motor 3 is controlled according to the seventh embodiment of the present invention. In FIG. 20, f1 is the initial frequency, Pmax is the pulse width at which the maximum value is obtained, and Pmid is the intermediate pulse width. In the seventh embodiment of the present invention, the pulse width upon starting is set at a value at which the maximum output can be obtained from the vibration wave motor, and the pulse width is set at an intermediate value in the vicinity of the target speed. For this reason, even when the frequency is fixed after the driving speed has reached the target speed, the output can be increased by manipulating the pulse width, and stable control is assured.

(Eighth Embodiment)

FIG. 21 is a flow chart showing the eighth embodiment of the present invention. Since the arrangement of a control circuit of the eighth embodiment is the same as that in the seventh embodiment, a detailed description thereof will be omitted. The operation according to the eighth embodiment of the present invention will be described in detail below with reference to FIG. 21.

When a start command of the vibration wave motor is issued in response to an external signal or inside the microcomputer, driving is started in STEP 20.

In STEP 21, a predetermined initial frequency is output to the pulse generator 1.

In STEP 22, a maximum pulse width within the range in which the vibration wave motor 3 or transformer 2 is not destroyed is set in the pulse generator 1 as pulse width data.

In STEP 23, data (v) is input from the speed detector 5.

In STEP 24, it is checked if the input speed (v) is larger than a predetermined value (v1) smaller than the target speed. If NO in STEP 24, the flow advances to STEP 25.

In STEP 25, the driving frequency is decreased. When the acceleration is to be increased, the decrement of the frequency is set to be large; otherwise, the decrement is set to be small. After STEP 25 is executed, the flow returns to STEP 23. The operations from STEP 23 to STEP 25 are executed at predetermined time intervals using timer interrupts or the like produced by the microcomputer, although not shown.

If it is determined in STEP 24 that the driving speed (v) has reached the predetermined speed (v1), the flow advances to STEP 26 to input the speed (v).

In STEP 27, it is checked if the current driving pulse width (p) is larger than a predetermined intermediate value (Pmid). If YES in STEP 27, the flow advances to STEP 28 to decrease the pulse width; otherwise, the flow skips STEP 28 and advances to STEP 29. In the seventh embodiment, the intermediate pulse width value is set at one time in STEP 7 in FIG. 16, while in this embodiment, the pulse width is gradually decreased by a predetermined amount in STEP 28.

In STEP 29, it is checked if the driving speed has reached the target speed. If NO in STEP 29, the frequency is decreased in STEP 30. The operations from STEP 26 to STEP 30 are also executed at predetermined time intervals using timer interrupts or the like produced by the microcomputer, although not shown.

If it is determined in STEP 29 that the driving speed has reached the target speed (V2), the flow advances to STEP 31. In STEP 31, data is input form the speed detector 5.

In STEP 32, the difference (v2−v) between the input speed (v) and the target speed is fed back to manipulate the pulse width, thus controlling the speed.

If it is determined in STEP 33 that a stop command of the vibration wave motor is issued in response to an external signal or inside the microcomputer, the pulse generation is stopped, thus ending the processing.

During the operation from STEP 31 to STEP 33 described above, the frequency is fixed at a value finally set in STEP 30. Also, the operations from STEP 31 to STEP 33 are executed at predetermined time intervals using timer interrupts or the like produced by the microcomputer, although not shown.

FIG. 22 shows the profiles of the speed, frequency, and pulse width obtained when the vibration type (wave) motor 3 is controlled according to the eighth embodiment of the present invention. In FIG. 22, f1 is the initial frequency, Pmax is the pulse width at which the maximum value is obtained, and Pmid is the intermediate pulse width. The difference between the eighth and seventh embodiments of the present invention is as follows. That is, in the seventh embodiment, the pulse width is changed to the intermediate pulse width (Pmid) at one time, while in the eighth embodiment, the pulse width is gradually changed to avoid abrupt speed drifts upon changing the pulse width.

(Ninth Embodiment)

FIG. 23 is a flow chart showing the ninth embodiment of the present invention. Since the arrangement of a control circuit of the ninth embodiment is the same as that in the seventh embodiment, a detailed description thereof will be omitted. In the seventh and eighth embodiments of the present invention, the microcomputer performs different operations upon acceleration. In this embodiment, the vibration type (wave) motor is controlled to be accelerated on the basis of a predetermined acceleration table (stored in, e.g., the internal memory of the microcomputer 6). The operation according to the ninth embodiment of the present invention will be described in detail below with reference to FIG. 23.

When a start command of the vibration wave motor is issued in response to an external signal or inside the microcomputer, driving is started in STEP 40.

In STEP 41, a predetermined initial frequency is output to the pulse generator 1.

In STEP 42, a maximum pulse width within the range in which the vibration wave motor 3 or transformer 2 is not destroyed is set in the pulse generator 1 as pulse width data.

In STEP 43, a first value (v'1) in the acceleration table is set as the target speed. The acceleration table defines the target speed in correspondence with the lapsed time, as shown in FIG. 24. Upon acceleration, the target speed is changed in the order from the upper speeds in the table, and the vibration type (wave) motor can be started at an arbitrary acceleration. This embodiment uses a table which starts the motor up to 75 [rpm] in 250 [msec] at an equal acceleration.

In STEP 44, data (v) is input from the speed detector 5.

In STEP 45, it is checked if the time of changing the target speed has been reached. In the acceleration table of this embodiment shown in FIG. 24, the target speed is changed at 10-msec intervals. If NO in STEP 45, the flow advances to STEP 46 to control the driving frequency of the vibration type (wave) motor to attain the current target speed (v'n).

In STEP 47, the next data in the acceleration table is set as the target speed.

In STEP 48, it is checked if the current lapsed time is the command time of a predetermined speed. Note that the predetermined speed corresponds to v1 in the seventh and eighth embodiments. If the predetermined speed (v1) is assumed to be 51 [rpm], when v'17 is set as the target value in the table in FIG. 24, i.e., when 170 [msec] have lapsed from the start, YES is determined in STEP 48.

If YES is determined in STEP 48, the flow advances to STEP 49 to output an intermediate pulse width.

If NO is determined in STEP 48, it is checked in STEP 50 if the speed command is a final value, i.e., if the data in the table has reached the last data. If NO in STEP 50, the flow returns to STEP 44; otherwise, the flow advances to STEP 51 to continue speed control by manipulating the pulse width until the stop command is issued, as in the seventh and eighth embodiments.

The difference between the ninth embodiment of the present invention, and the seventh and eighth embodiments of the present invention is as follows. That is, in the seventh and eighth embodiments, acceleration is attained by sweeping the frequency, while in the ninth embodiment, acceleration is attained based on the acceleration table, thus always setting the same rise time and acceleration of the vibration wave motor.

(Tenth Embodiment)

FIG. 25 shows the tenth embodiment of the present invention. In this embodiment, control attained by manipulating the pulse width in the seventh embodiment is attained by manipulating the phase difference. The vibration type (wave) motor used in this embodiment is driven by applying alternating current voltages as two-phase alternating current signals. When the phase difference between these two phases is 90° and −90°, the output of the vibration wave motor is maximized. The rotation direction when the phase difference is 90° is different from that when it is −90°. In order to obtain the same effect as in the seventh embodiment, 90° as the phase difference that can obtain the maximum output are set in STEP 62, and 75° that can obtain an intermediate output are set in STEP 66.

Since other operations are substantially the same as those in the seventh embodiment except that the speed is controlled by manipulating the phase difference in STEP 71, a detailed description thereof will be omitted.

In the seventh, eighth, ninth, and tenth embodiments described above, the frequency, pulse width, and phase difference are controlled by software of the microcomputer. Alternatively, a logic circuit, a DSP, or the like may be used in place of the microcomputer to obtain the same effect. Also, only one driving direction of the vibration type (wave) motor is described. However, when the motor is driven in the opposite direction, the driving pulses input to the A and B phases of the vibration type (wave) motor 3 may be replaced using, e.g., a switch.

Although not described as a specific embodiment, the pulse width may be gradually changed to the intermediate pulse width across a plurality of steps in the ninth and 10th embodiments, and the acceleration may be performed using the acceleration table in the 10th embodiment.

What is claimed is:

1. A vibration type actuator device in which a frequency signal is applied to an electro-mechanical energy conversion element portion to generate therein vibration that is used as a driving force, said vibration type actuator device comprising:

a frequency control circuit that varies;

an amplitude control circuit that varies an amplitude of the frequency signal; and a driving control circuit that controls operation of said frequency control circuit and said amplitude control circuit to obtain a target control state of said vibration type actuator device, said driving control circuit controlling said frequency control circuit to vary the frequency until a control state of said vibration type actuator device reaches a first control state different from the target control state and then to lock the frequency of the frequency signal, and thereafter controlling said amplitude control circuit to vary the amplitude of the frequency signal so as to obtain the target control state.

2. A vibration type actuator device according to claim 1, wherein the target control state is a target speed, and the first control state is a speed higher than the target speed.

3. A vibration type actuator device according to claim 1, further comprising a setting circuit that sets the amplitude of the frequency signal at a maximum amplitude during a time in which said driving control circuit is controlling said frequency control circuit so as to vary the frequency of the frequency signal to obtain the first control state.

4. A vibration type actuator device according to claim 1, further comprising a driving unit that forms a frequency voltage signal in accordance with a frequency of an input pulse and applies the frequency voltage signal to the electro-mechanical energy conversion element portion, and wherein said amplitude control circuit varies the amplitude of the frequency signal by varying a pulse width of the input pulse.

5. A vibration type actuator device in which frequency signals having different phases are applied to first and second electro-mechanical energy conversion element portions to generate therein vibration that is used as a driving force, said vibration type actuator device comprising:

a frequency control circuit that varies a frequency of the frequency signals;

a phase control circuit that varies a phase difference between the frequency signals; and a driving control circuit that controls operation of said frequency control circuit and said phase control circuit to obtain a target control state of said vibration type actuator device, said driving control circuit controlling said frequency control circuit to vary the frequency of the frequency signals until a control state of said vibration type actuator reaches a first control state different from the target control state and then to lock the frequency of the frequency signals, and thereafter controlling said phase control circuit to vary the phase difference between the frequency signals so as to obtain the target control state.

6. A vibration type actuator device according to claim 5, wherein the target control state is a target speed, and the first control state is a speed higher than the target speed.

7. A vibration type actuator device according to claim 5, further comprising a setting circuit that sets the phase difference between the frequency signals at 90° during a time in which said driving control circuit is controlling said frequency control circuit so as to vary the frequency of the frequency signals to obtain the first control state.

8. A vibration type actuator device in which a frequency signal is applied to an electro-mechanical energy conversion element portion to generate therein vibration that is used as a driving force, and where a target control state is maintained by locking a frequency of the frequency signal and varying an amplitude of the frequency signal, said vibration type actuator device comprising:

a frequency control circuit that varies the frequency of the frequency signal;

an amplitude control circuit that varies an amplitude of the frequency signal; and a driving control circuit that controls operation of said frequency control circuit and said amplitude control circuit to change the target control state of said vibration type actuator device to a new target control state, said driving control circuit (1) locking the amplitude of the frequency signal and controlling said frequency control circuit to vary the frequency of the frequency signal such that a control state of said vibration type actuator device proximally approaches the new target control state, and then (2) locking the frequency of the frequency signal and thereafter controlling said amplitude control circuit to change the amplitude of the frequency signal to obtain and maintain the new target control state.

9. A vibration type actuator device according to claim 8, wherein said driving control circuit controls said frequency control circuit so as to vary the frequency of the frequency signal until the control state reaches a predetermined state.

10. A vibration type actuator device according to claim 9, wherein the target control state is a target speed and the predetermined state is a speed higher than the target speed.

11. A vibration type actuator device according to claim 8, wherein before said driving control circuit controls said frequency control circuit so as to vary the frequency of the frequency signal such that the control state of the vibration type actuator device proximally approaches the new target control state, said driving control circuit controls said amplitude control circuit so as to lock the amplitude of the frequency signal at an amplitude.

12. A vibration type actuator device according to claim 8, wherein before said driving control circuit controls said frequency control circuit so as to vary the frequency of the frequency signal such that the control state of said vibration type actuator device proximally approaches the new target control state, said driving control circuit controls said amplitude control circuit so as to lock the amplitude of the frequency signal at a predetermined amplitude.

13. A vibration type actuator device according to claim 12, wherein the predetermined amplitude is a maximum amplitude.

14. A vibration type actuator device in which a frequency signal is applied to an electro-mechanical energy conversion element portion to generate therein vibration that is used as a driving force, and where a target control state of said vibration type actuator device is maintained by locking a frequency of the frequency signal and varying an amplitude of the frequency signal, said vibration type actuator device comprising:

a frequency control circuit that varies a frequency of the frequency signal;

an amplitude control circuit that varies an amplitude of the frequency signal; and a driving control circuit that controls operation of said frequency control circuit and said amplitude control circuit to change the target control state of said vibration type actuator device to a new target control state, said driving control circuit controlling said frequency control circuit to vary the frequency of the frequency signal such that a control state of said vibration type actuator device proximally approaches the new target control state and simultaneously controlling said amplitude control circuit so as to gradually change the amplitude of the frequency signal to a predetermined amplitude, and thereafter locking the frequency of the frequency signal and controlling said amplitude control circuit so as to vary the amplitude of the frequency signal to obtain and maintain the new target control state.

15. A vibration type actuator device in which frequency signals having different phases are applied to first and second electro-mechanical energy conversion element portions to generate therein vibration that is used as a driving force, and where a target control state of the vibration type actuator device is maintained by locking a frequency of the frequency signals and varying a phase difference between the frequency signals, said vibration type actuator device comprising:

a frequency control circuit that varies the frequency of the frequency signals;

a phase control circuit that varies the phase difference between the frequency signals; and a driving control circuit that controls operation of said frequency control circuit and said phase control circuit to change the target control state of said vibration type actuator device to a new target control state, said driving control circuit controlling said frequency control circuit so as to vary the frequency of the frequency signals so that the target control state proximally approaches the new target control state, and thereafter locking the frequency of the frequency signal and controlling the phase control circuit so as to vary the phase difference between the frequency signals so as to obtain and maintain the new target control state.

16. A vibration type actuator device according to claim 15, wherein said driving control circuit controls said frequency control circuit so as to vary the frequency of the frequency signals until a driving state of said vibration type actuator device reaches a predetermined state.

17. A vibration type actuator device according to claim 16, wherein the driving state is a driving speed, and the predetermined state is a driving speed higher than a target driving speed.

18. A vibration type actuator device according to claim 15, wherein before said driving control circuit controls said frequency control circuit so as to vary the frequency of the frequency signal so as to obtain a new target control state, said driving control circuit controls said phase control circuit so as to lock the phase difference between the frequency signals at a phase difference.

19. A vibration type actuator device according to claim 15, wherein before said driving control circuit controls said frequency control circuit so as to vary the frequency of the frequency signals so as to obtain a new target control state, said driving control circuit controls said phase control circuit so as to lock the phase difference between the frequency signals at a predetermined phase difference.

20. A vibration type actuator device according to claim 19, wherein the predetermined phase difference is 90°.

21. A vibration type actuator device in which a frequency signal is applied to an electro-mechanical energy conversion element portion to generate therein vibration that is used as a driving force, said vibration type actuator device comprising:

a frequency control circuit that varies a frequency of the frequency signal;

an amplitude control circuit that varies an amplitude of the frequency signal; and a driving control circuit that controls operation of said frequency control circuit and said amplitude control circuit to obtain a target control state of said vibration type actuator device, said driving control circuit controlling said frequency control circuit so as to vary the frequency of the frequency signal until a predetermined control state of said actuator device is obtained, and thereafter controlling the frequency control circuit so as to lock the frequency of the frequency signal and controlling said amplitude control circuit to change the amplitude of the frequency signal to obtain the target control state, wherein during a time when said driving control circuit controls the frequency control circuit so as to vary the frequency until the predetermined control state of said vibration type actuator device is obtained, said driving control circuit also controls said amplitude control circuit so as to change the amplitude of the frequency signal at a predetermined timing after said frequency control circuit starts to vary the frequency of the frequency signal and before said frequency control circuit locks the frequency of the frequency signal.

22. A vibration type actuator device according to claim 21, wherein when said amplitude control circuit changes the amplitude of the frequency signal at the predetermined timing, said amplitude control circuit sets the amplitude of the frequency signal at a predetermined amplitude between a maximum amplitude and a minimum amplitude.

23. A device according to claim 22, wherein at a time when said frequency control circuit begins to vary the frequency of the frequency signal so as to change the control state of said vibration type actuator device to obtain the predetermined control state, said driving control circuit controls said amplitude control circuit so as to set the amplitude of the frequency signal at an amplitude larger than the predetermined amplitude.

24. A vibration type actuator device according to claim 21, wherein the predetermined control state is a target control state.

25. A vibration type actuator device according to claim 24, wherein the predetermined control state is a speed control state.

26. A vibration type actuator device according to claim 21, wherein when said amplitude control circuit changes the amplitude of the frequency signal at the predetermined timing, said amplitude control circuit gradually changes the amplitude of the frequency signal to a predetermined amplitude.

27. A vibration type actuator device according to claim 26, wherein said driving control circuit controls said amplitude control circuit so as to set the amplitude of the frequency signal at an amplitude larger than the predetermined amplitude at a time when said frequency control circuit starts to vary the frequency of the frequency signal to obtain the predetermined control state.

28. A vibration type actuator device according to claim 21, wherein said frequency control circuit varies the frequency of the frequency signal on the basis of control data stored in a table and having a lapsed time as a factor.

29. A vibration type actuator device in which frequency signals having different phases are applied to first and second electro-mechanical energy conversion element portions to generate therein vibration that is used as a driving force, said vibration type actuator device comprising:

a frequency control circuit that varies a frequency of the frequency signals;

a phase difference control circuit that varies a phase difference between the frequency signals; and a driving control circuit that controls operation of said frequency control circuit and said phase difference control circuit to obtain a target control state of said vibration type actuator device, said driving control circuit controlling said frequency control circuit so as to vary the frequency of the frequency signals until a control state of said vibration type actuator device reaches a predetermined control state, and thereafter controlling operation of the frequency control circuit to lock the frequency of the frequency signals and controlling operation of said phase difference control circuit to vary the phase difference between the frequency signals so as to obtain the target control state, and wherein at a predetermined timing after said frequency control circuit starts to vary the frequency of the frequency signals and before said frequency control circuit locks the frequency of the frequency signals said driving control circuit controls said phase difference control circuit so as to change the phase difference between the frequency signals.

30. A vibration type actuator device according to claim 29, wherein at the predetermined timing, said phase difference control circuit sets the phase difference between the frequency signals at a predetermined phase difference in a range of 0° to 90°.

31. A vibration type actuator device according to claim 30, wherein at a time when said frequency control circuit begins to vary the frequency of the frequency signals so as to obtain the predetermined control state, said driving control circuit controls said phase difference control circuit so as to set the phase difference between the frequency signals at 90°.

32. A vibration type actuator device according to claim 29, wherein the predetermined control state is a target control state.

33. A vibration type actuator device according to claim 32, wherein the predetermined control state is a speed control state.

* * * * *

UNITED STATES PATENT AND TRADEMARK OFFICE
CERTIFICATE OF CORRECTION

PATENT NO.     : 6,054,795
DATED          : April 25, 2000
INVENTOR(S)    : Shinji Yamamoto et al.

It is certified that error appears in the above-identified patent and that said Letters Patent is hereby corrected as shown below:

Title page,
Item [57], ABSTRACT,
Line 1, "This invention relates to a" should read -- A --;
Line 4, "element." should read -- element includes --; and
Line 5, "¶This invention provides" should be deleted.

Column 1,
Line 18, "the" should read -- a --;
Line 22, "clocks," should read -- clock signals, --;
Line 24, "transformer as" should read -- transformer (used as --; and "means" should read -- means) --;
Line 25, "clocks." should read -- clock signals. --; and
Line 28, "clock frequency" should read -- clock signal frequency --.

Column 3,
Line 29, "EMBODIMENT" should read -- EMBODIMENTS --;
Line 31, "the" should read -- a --;
Line 39, "generator" should read -- pulse generator --;
Line 50, "a" should read -- "a" --; and
Line 58, "b" should read -- "b" --.

Column 4,
Line 10, "d" should read -- "d" --;
Line 12, "e" should read -- "e" --;
Line 13, "f" should read -- "f" --;
Line 28, "between vibra-" should read -- between two vibra- --;
Line 48, "inside" should read -- internal signal of --;
Line 52, "case assumes" should read -- case always assumes --; and "which" should be deleted;
Line 53, "vibration type (wave)" should read -- vibration wave type --;
Line 54, "3" should read -- 3, --; "is set" should be deleted; and "when the" should read -- where a --;
Line 55, "differences" should read -- differences, --;
Line 58, "directions to have" should read -- directions, with --; and
Line 59, "becomes" should read -- is --.

Column 5,
Line 6, "the" (first occurrence) should read -- a --;
Line 42, "constant or using" should read -- constant, or by using --;
Lines 52 and 59, "vibration type (wave)" should read -- vibration wave type --; and
Line 55, "tion type (wave)" should read -- tion wave type --.

UNITED STATES PATENT AND TRADEMARK OFFICE
CERTIFICATE OF CORRECTION

PATENT NO. : 6,054,795
DATED : April 25, 2000
INVENTOR(S) : Shinji Yamamoto et al.

It is certified that error appears in the above-identified patent and that said Letters Patent is hereby corrected as shown below:

Column 6,
Lines 4, 37 and 42, "vibration type (wave)" should read -- vibration wave type --;
Line 6, "vibration type" should read -- vibration wave type --;
Line 7, "(wave)" should be deleted; and "replaced" should read -- switched --;
Line 32, "inside" should read -- internal signal of --;
Line 36, "case assumes" should read -- case always assumes --; and "which" should be deleted;
Line 38, "3" should read -- 3, --; "is set" should be deleted; and "when" should read -- where --; and
Line 43, "are" should read -- is --.

Column 7,
Line 11, "constant or using" should read -- constant, or by using --;
Lines 24 and 45, "vibration type (wave)" should read -- vibration wave type --;
Lines 47 and 66, "vibration type" should read -- vibration wave type --;
Line 48, "(wave)" should be deleted --; and
Line 67, "(wave)" should be deleted.

Column 8,
Lines 4 and 67, "vibration type (wave)" should read -- vibration wave type --;
Line 22, "tion type (wave)" should read -- tion wave type --; and
Line 39, "separate from" should read -- separate away from --.

Column 9,
Line 12, "vibration type" should read -- vibration wave type --;
Line 13, "(wave)" should be deleted --;
Line 15, "need be" should read -- needs to be --; and
Lines 28, 32 and 33, "vibration type (wave)" should read -- vibration wave type --.

Column 10,
Line 11, "separate from" should read -- separate away from --;
Lines 12, 31, 51, 54 and 67, "vibration type (wave)" should read -- vibration wave type --;
Line 31, "vibration type (wave)" should read -- vibration wave type --; and
Line 44, "value, if" should read -- value, and if --.

Column 11,
Lines 1 and 43, "vibration type (wave)" should read -- vibration wave type --; and
Line 30, "separate from" should read -- separate away from --.

Column 12,
Line 2, "therein" should read -- therein, --; and "the" should read -- a --;

UNITED STATES PATENT AND TRADEMARK OFFICE
CERTIFICATE OF CORRECTION

PATENT NO. : 6,054,795
DATED : April 25, 2000
INVENTOR(S) : Shinji Yamamoto et al.

It is certified that error appears in the above-identified patent and that said Letters Patent is hereby corrected as shown below:

Column 12 (cont'd),
Lines 10 and 21, "vibration" should read -- (vibration --; and "(wave)" should read -- wave) --;
Lines 35, 48, 53, 56 and 62, "vibration type (wave)" should read -- vibration wave type --;
Line 40, "of" should read -- printed on --;
Line 42, "character portion," should read -- character printing portion, --; and
Line 57, "FIG. 11," should read -- FIG. 12, --.

Column 13,
Line 5, "vibration type" should read -- vibration wave type --;
Line 6, "(wave)" should be deleted;
Line 30, "a" should read -- "a" --;
Line 37, "b" should read -- "b" --;
Line 47, "c" should read -- "c" --;
Line 59, "d" should read -- "d" --;
Line 61, "e" should read -- "e" --; and
Line 62, "f" should read -- "f" --.

Column 14,
Lines 4, 30 and 36, "vibration type (wave)" should read -- vibration wave type --;
Line 19, "method by" should read -- method used by --;
Line 28, "determined" should read -- determined or selected --;
Line 31, "inside" should read -- internal signal of --;
Line 35, "case assumes" should read -- case always assumes --; and "which" should be deleted;
Line 37, "3" should read -- 3, --; "is set" should be deleted; and "when the" should read -- where a --;
Line 38, "differences" should read -- differences, --; and "or the" should read -- or when the --; and
Line 50, "type (wave)" should read -- wave type --.

Column 15,
Lines 22 and 54, "inside" should read -- internal signal of --; and
Line 31, "vibration type (wave)" should read -- vibration wave type --.

Column 16,
Line 25, "(V2)," should read -- (v2), --;
Line 26, "form" should read -- from --;
Line 33, "inside" should read -- internal signal of --;
Line 42, "vibration type (wave)" should read -- vibration wave type --; and
Line 63, "tion type (wave)" should read -- tion wave type --.

UNITED STATES PATENT AND TRADEMARK OFFICE
CERTIFICATE OF CORRECTION

PATENT NO. : 6,054,795
DATED : April 25, 2000
INVENTOR(S) : Shinji Yamamoto et al.

It is certified that error appears in the above-identified patent and that said Letters Patent is hereby corrected as shown below:

Column 17,
Line 2, "inside" should read -- internal signal of --;
Line 14, "vibration type (wave)" should read -- vibration wave type --; and
Line 24, "type (wave)" should read -- wave type --;
Line 57, "vibration type" should read -- vibration wave type --; and
Line 58, "(wave)" should be deleted.

Column 18,
Line 9, "vibration type (wave)" should read -- vibration wave type --; and
Line 13, "replaced" should read -- switched --.
Line 21, claim 1 should be deleted and substituted with the following:
-- 1. A vibration type actuator device in which a frequency signal is applied to an electro-mechanical energy conversion element portion to generate therein vibration that is used as a driving force, said vibration type actuator device comprising:

a frequency control circuit that varies a frequency of the frequency signal;

an amplitude control circuit that varies an amplitude of the frequency signal; and a driving control circuit that controls operation of said frequency control circuit and said amplitude control circuit to obtain a target control state of said vibration type actuator device, said driving control circuit controlling said frequency control circuit to vary the frequency until a control state of said vibration type actuator device reaches a first control state different from the target control state and then to lock the frequency of the frequency signal, and thereafter controlling said amplitude control circuit to vary the amplitude of the frequency signal so as to obtain the target control state. --.

Column 22,
Line 12, claim 29 should be deleted and substituted with the following:
-- 29. A vibration type actuator device in which frequency signals having different phases are applied to first and second electro-mechanical energy conversion element portions to generate therein vibration that is used as a driving force, said vibration type actuator device comprising:

a frequency control circuit that varies a frequency of the frequency signals;

a phase difference control circuit that varies a phase difference between the frequency signals; and

UNITED STATES PATENT AND TRADEMARK OFFICE
CERTIFICATE OF CORRECTION

PATENT NO. : 6,054,795
DATED : April 25, 2000
INVENTOR(S) : Shinji Yamamoto et al.

It is certified that error appears in the above-identified patent and that said Letters Patent is hereby corrected as shown below:

Column 22 (cont'd),
    a driving control circuit that controls operation of said frequency control circuit and said phase difference control circuit to obtain a target control state of said vibration type actuator device, said driving control circuit controlling said frequency control circuit so as to vary the frequency of the frequency signals until a control state of said vibration type actuator device reaches a predetermined control state, and thereafter controlling operation of the frequency control circuit to lock the frequency of the frequency signals and controlling operation of said phase difference control circuit to vary the phase difference between the frequency signals so as to obtain the target control state, and wherein at a predetermined timing after said frequency control circuit starts to vary the frequency of the frequency signals and before said frequency control circuit locks the frequency of the frequency signals, said driving control circuit controls said phase difference control circuit so as to change the phase difference between the frequency signals. --.

Signed and Sealed this

First Day of November, 2005

JON W. DUDAS
*Director of the United States Patent and Trademark Office*